United States Patent
Matsubara et al.

(10) Patent No.: US 12,229,474 B2
(45) Date of Patent: Feb. 18, 2025

(54) POSITION DETECTION SYSTEM THAT OUTPUTS ARTIFICIAL SOUND IMITATING SOUND THAT OCCURS WHEN STATIONERY IS USED

(71) Applicant: Wacom Co., Ltd., Saitama (JP)

(72) Inventors: Hiroaki Matsubara, Shizuoka (JP); Akiyuki Kake, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/471,982

(22) Filed: Sep. 21, 2023

(65) Prior Publication Data

US 2024/0012612 A1 Jan. 11, 2024

Related U.S. Application Data

(63) Continuation of application No. PCT/JP2023/006771, filed on Feb. 24, 2023.

(30) Foreign Application Priority Data

Feb. 28, 2022 (JP) ................... 2022-029187

(51) Int. Cl.
*G06F 3/16* (2006.01)
*G06F 3/0354* (2013.01)
*G06F 3/038* (2013.01)

(52) U.S. Cl.
CPC .......... *G06F 3/167* (2013.01); *G06F 3/03545* (2013.01); *G06F 3/0383* (2013.01)

(58) Field of Classification Search
CPC ...................................................... G06F 3/167
See application file for complete search history.

(56) References Cited

U.S. PATENT DOCUMENTS

| | | | |
|---|---|---|---|
| 2017/0192493 A1* | 7/2017 | Ofek | G06F 3/04883 |
| 2017/0279946 A1* | 9/2017 | Chang | H04M 1/6016 |
| 2017/0286092 A1* | 10/2017 | Zhu | G06F 8/654 |
| 2020/0183507 A1* | 6/2020 | Tamura | G06F 3/167 |
| 2020/0183508 A1* | 6/2020 | Tamura | G10K 15/04 |

FOREIGN PATENT DOCUMENTS

| | | |
|---|---|---|
| JP | 2020091780 A | 6/2020 |
| JP | 2020091781 A | 6/2020 |
| WO | WO 2008078523 A1 | 7/2008 |

OTHER PUBLICATIONS

International Search Report, mailed May 9, 2023 for PCT Application No. PCT/JP2023/006771. (2 pages).

* cited by examiner

*Primary Examiner* — Chun-Nan Lin
(74) *Attorney, Agent, or Firm* — Seed IP Law Group LLP

(57) ABSTRACT

Disclosed is a position detection system that includes an electronic pen and a detecting circuit configured to detect a position indicated by the electronic pen on an input surface of a touch sensor in which a plurality of sensor electrodes are arranged in a planar shape, the position detection system receives a selection of a category of a stationery to be imitated, detects a pen state representing a state of the electronic pen with respect to the input surface and an operation state representing a state of an operation of the electronic pen, and outputs, in response to an input operation performed by the electronic pen to indicate the position, an artificial sound imitating a sound occurring when the stationery is used, according to the selection of the category that is received.

16 Claims, 19 Drawing Sheets

FIG. 4

| CATEGORY | | MATERIAL PROPERTY (HARDNESS, VISCOSITY) | PEN DETECTION VALUE | SOUND ID |
|---|---|---|---|---|
| FIRST CATEGORY | PENCIL | B | LARGE | S11 |
| | | | SMALL | S12 |
| | | H | LARGE | S13 |
| | | | SMALL | S14 |
| | BALLPOINT PEN | WATER-BASED | LARGE | S15 |
| | | | SMALL | S16 |
| | | OIL-BASED | LARGE | S17 |
| | | | SMALL | S18 |
| | ERASER | PLASTIC | LARGE | S19 |
| | | | SMALL | S20 |
| | | RUBBER | LARGE | S21 |
| | | | SMALL | S22 |
| | SAND ERASER | SILICA SAND | LARGE | S23 |
| | | | SMALL | S24 |
| | CORRECTION FLUID (PEN) | WATER-BASED | LARGE | S25 |
| | | | SMALL | S26 |
| | | OIL-BASED | LARGE | S27 |
| | | | SMALL | S28 |
| SECOND CATEGORY | FOUNTAIN PEN | WATER-BASED | LARGE | S29 |
| | | | SMALL | S30 |
| | | OIL-BASED | LARGE | S31 |
| | | | SMALL | S32 |
| | WRITING BRUSH | SOFT HAIR WRITING BRUSH | LARGE | S33 |
| | | | SMALL | S34 |
| | | BRISTLE WRITING BRUSH | LARGE | S35 |
| | | | SMALL | S36 |
| | CORRECTION FLUID (BRUSH) | WATER-BASED | LARGE | S37 |
| | | | SMALL | S38 |
| | | OIL-BASED | LARGE | S39 |
| | | | SMALL | S40 |

60A

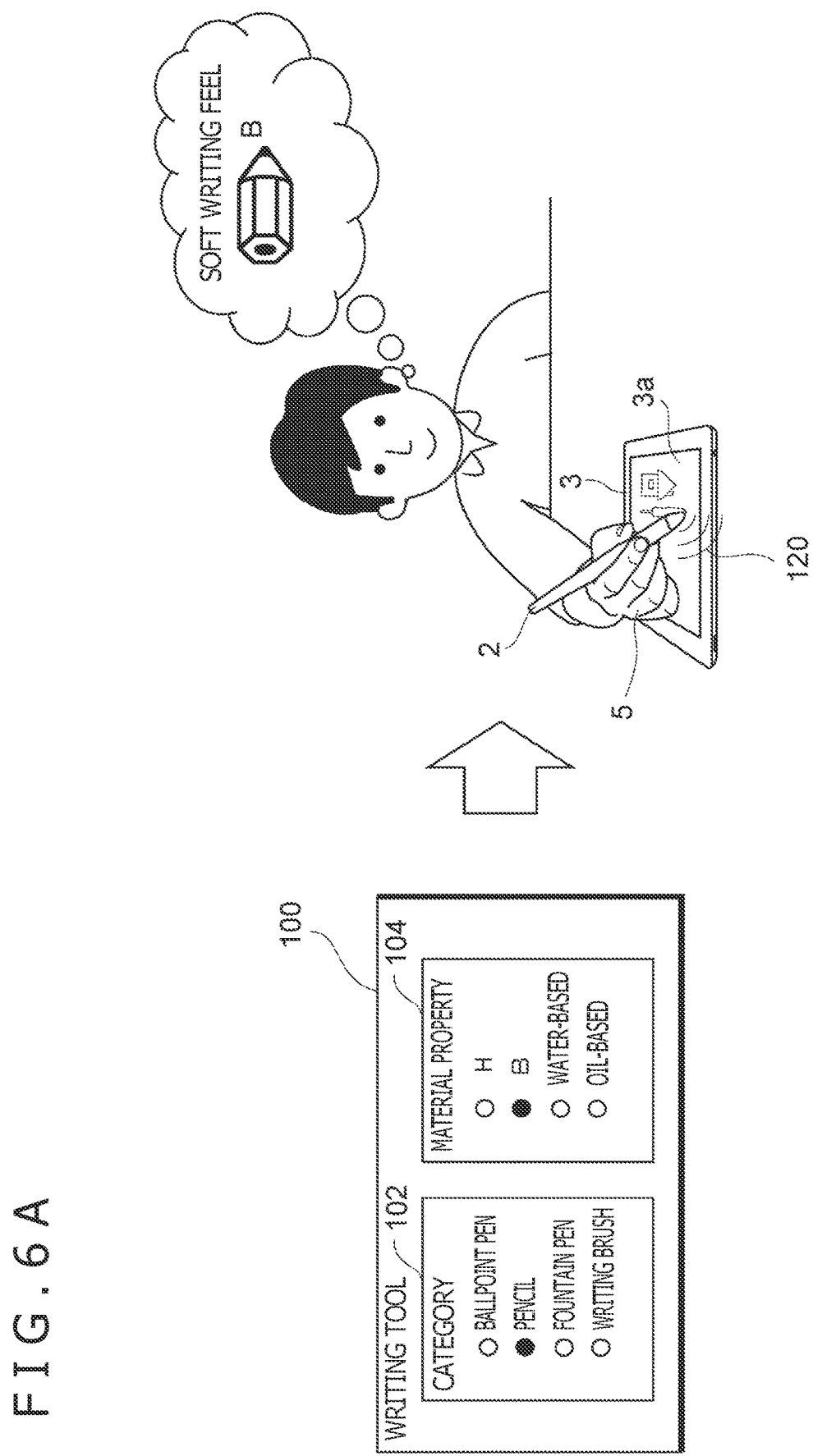
F I G. 6 A

F I G. 6 B
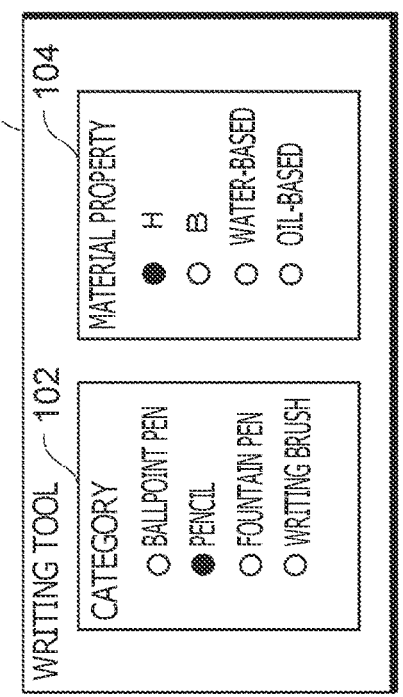
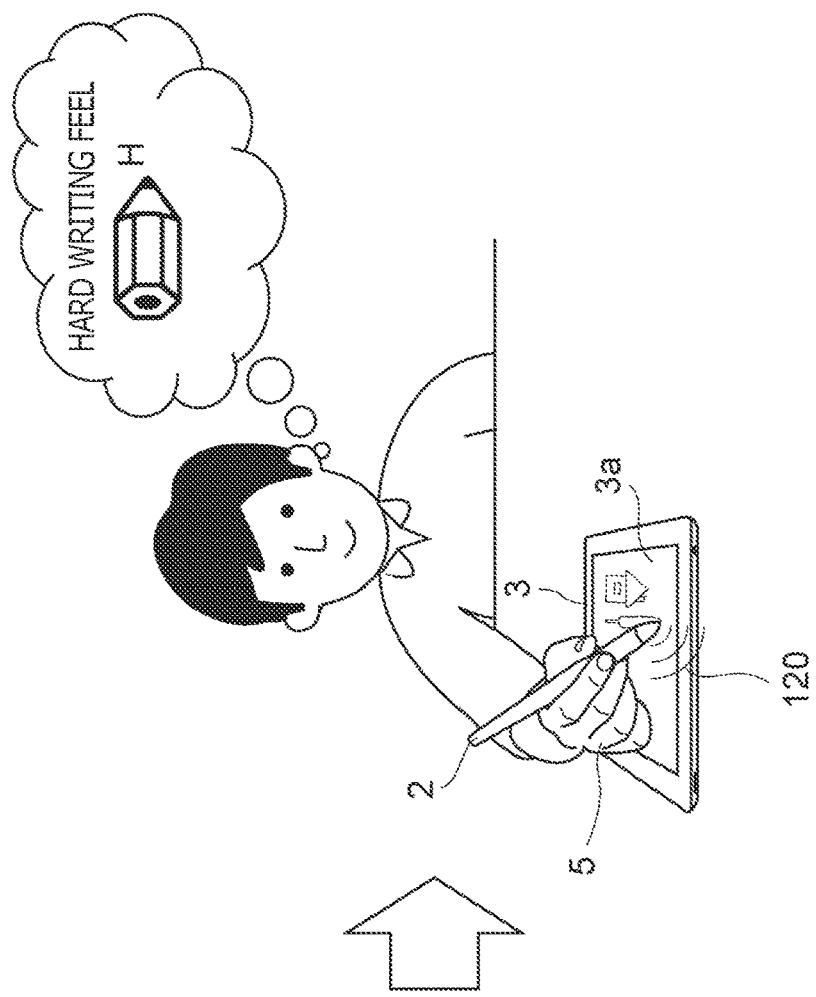

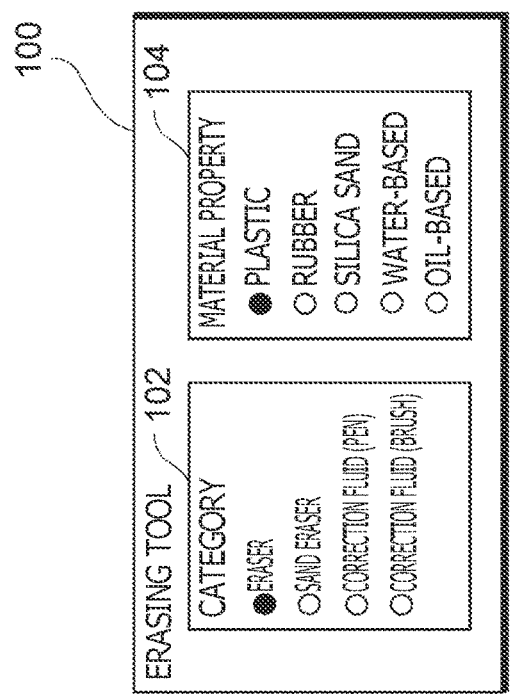
F I G. 7A
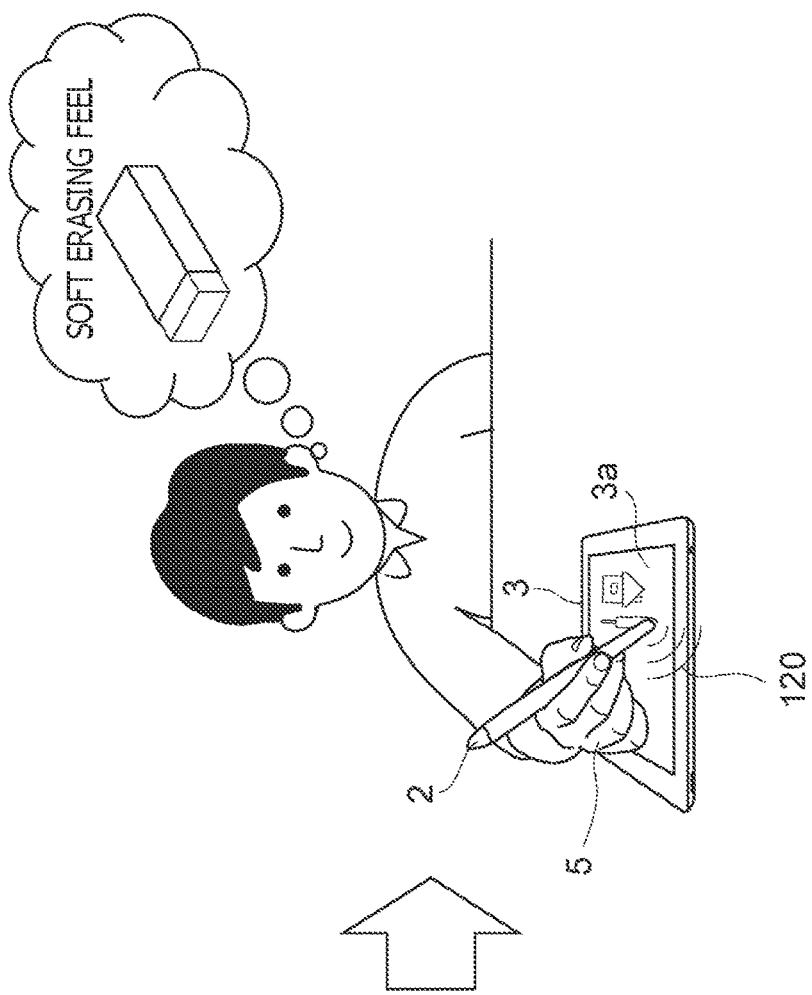

FIG. 7B
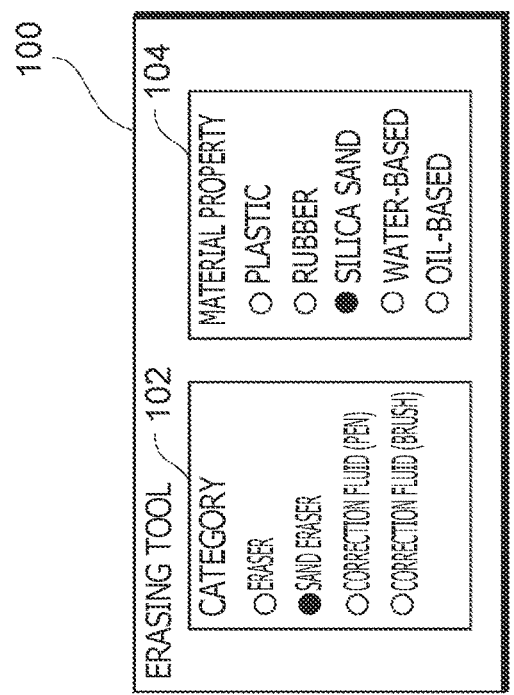
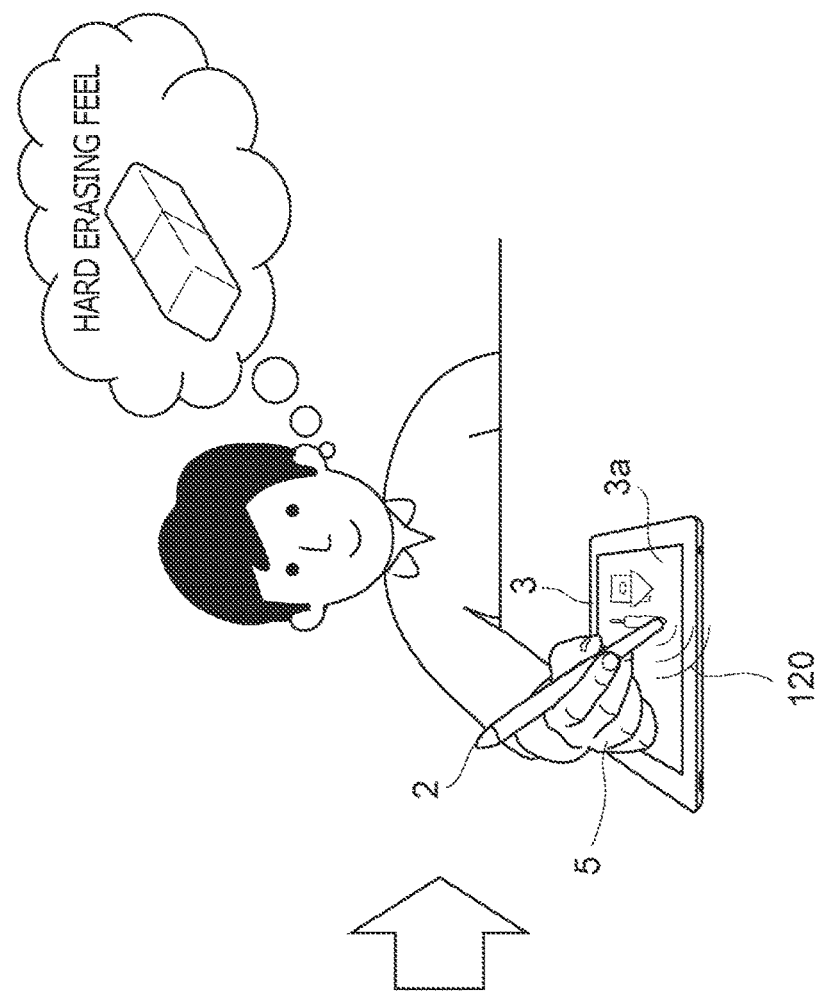

FIG.11

| CATEGORY | | MATERIAL PROPERTY (HARDNESS, VISCOSITY) | PEN DETECTION VALUE | RECORDED DATA | VOLUME | PITCH (FREQUENCY) |
|---|---|---|---|---|---|---|
| FIRST CATEGORY | PENCIL | B | LARGE | D(1) | VR(1) | FR(1) |
| | | | SMALL | D(2) | VR(2) | FR(2) |
| | | H | LARGE | D(3) | VR(3) | FR(3) |
| | | | SMALL | D(4) | VR(4) | FR(4) |
| | BALLPOINT PEN | WATER-BASED | LARGE | D(5) | VR(5) | FR(5) |
| | | | SMALL | D(6) | VR(6) | FR(6) |
| | | OIL-BASED | LARGE | D(7) | VR(7) | FR(7) |
| | | | SMALL | D(8) | VR(8) | FR(8) |
| | ERASER | PLASTIC | LARGE | D(9) | VR(9) | FR(9) |
| | | | SMALL | D(10) | VR(10) | FR(10) |
| | | RUBBER | LARGE | D(11) | VR(11) | FR(11) |
| | | | SMALL | D(12) | VR(12) | FR(12) |
| | SAND ERASER | SILICA SAND | LARGE | D(13) | VR(13) | FR(13) |
| | | | SMALL | D(14) | VR(14) | FR(14) |
| | CORRECTION FLUID (PEN) | WATER-BASED | LARGE | D(15) | VR(15) | FR(15) |
| | | | SMALL | D(16) | VR(16) | FR(16) |
| | | OIL-BASED | LARGE | D(17) | VR(17) | FR(17) |
| | | | SMALL | D(18) | VR(18) | FR(18) |
| SECOND CATEGORY | FOUNTAIN PEN | WATER-BASED | LARGE | D(19) | VR(19) | FR(19) |
| | | | SMALL | D(20) | VR(20) | FR(20) |
| | | OIL-BASED | LARGE | D(21) | VR(21) | FR(21) |
| | | | SMALL | D(22) | VR(22) | FR(22) |
| | WRITING BRUSH | SOFT HAIR WRITING BRUSH | LARGE | D(23) | VR(23) | FR(23) |
| | | | SMALL | D(24) | VR(24) | FR(24) |
| | | BRISTLE WRITING BRUSH | LARGE | D(25) | VR(25) | FR(25) |
| | | | SMALL | D(26) | VR(26) | FR(26) |
| | CORRECTION FLUID (BRUSH) | WATER-BASED | LARGE | D(27) | VR(27) | FR(27) |
| | | | SMALL | D(28) | VR(28) | FR(28) |
| | | OIL-BASED | LARGE | D(29) | VR(29) | FR(29) |
| | | | SMALL | D(30) | VR(30) | FR(30) |

60B

POSITION DETECTION SYSTEM THAT OUTPUTS ARTIFICIAL SOUND IMITATING SOUND THAT OCCURS WHEN STATIONERY IS USED

BACKGROUND

Technical Field

The present disclosure relates to a position detection system and an electronic pen.

Background Art

There is known a system in which writing input is performed by an electronic pen on an input surface of a touch panel or the like. In such a system, there has been proposed in the past a technology that generates an artificial sound to imitate a writing sound occurring when the writing is performed. For example, Japanese Patent Laid-Open No. 2020-91781 (hereinafter, referred to as Patent Document 1) discloses a technology that detects, by a microphone, a contact sound occurring when the electronic pen comes into contact with the input surface and that generates an artificial sound on the basis of the contact sound. In addition, in the technology disclosed in Patent Document 1, this electronic pen generates the artificial sound by using data corresponding to a writing mode such as a pencil writing mode or a ballpoint pen writing mode.

Meanwhile, some types of stationery such as a pencil and a ballpoint pen belong to the same category but have various different forms. Hence, it is assumed that users may be familiar to different stationery sounds depending on types of stationery that they regularly use. That is, the electronic pen described in Patent Document 1 may cause a user to feel some kind of strangeness during the use of the electronic pen since the artificial sound generated by the electronic pen differs from the sound expected by the user.

BRIEF SUMMARY

Embodiments of the present disclosure provide a position detection system and an electronic pen that can make, by an artificial sound, a user feel as if the user were actually using the stationery to be imitated.

According to a first aspect of the present disclosure, there is provided a position detection system that includes an electronic pen and a detecting circuit configured to detect a position indicated by the electronic pen on an input surface of a touch sensor in which a plurality of sensor electrodes are arranged in a planar shape, the position detection system including at least one processor, and at least one memory storing instructions that, when executed by the at least one processor, cause the position detection system to receive a selection of a category of stationery to be imitated, detect a pen state representing a state of the electronic pen with respect to the input surface and an operation state representing a state of an operation of the electronic pen, and output, in response to an input operation performed by the electronic pen to indicate the position, an artificial sound imitating a sound occurring when the stationery is used, according to the selection of the category that is received.

In the position detection system according to a second aspect of the present disclosure, the instructions, when executed by the at least one processor, cause the position detection system to, when the operation state is a pen-up state indicating that the electronic pen moves away from the input surface, change an output duration from a time point of detection of the pen-up state to a time point of stopping of the output of the artificial sound, based on the pen state.

In the position detection system according to a third aspect of the present disclosure, the instructions, when executed by the at least one processor, cause the position detection system to, when the operation state is a pen-down state indicating that the electronic pen comes into contact with the input surface, output the artificial sound based on a pen pressure of the electronic pen as the pen state, and when the operation state is a pen movement state indicating that the electronic pen moves on the input surface, output the artificial sound based on a posture or a movement of the electronic pen as the pen state.

In the position detection system according to a fourth aspect of the present disclosure, the instructions, when executed by the at least one processor, cause the position detection system to, when the operation state is a pen movement state indicating that the electronic pen moves on the input surface, output the artificial sound based on acceleration of the electronic pen as the pen state.

In the position detection system according to a fifth aspect of the present disclosure, the instructions, when executed by the at least one processor, cause the position detection system to receive an execution reference time point related to execution of a writing application for performing writing with use of the electronic pen or an elapsed time from the execution reference time point, and switch whether or not to output the artificial sound or changes an output mode of the artificial sound according to the elapsed time.

In the position detection system according to a sixth aspect of the present disclosure, the instructions, when executed by the at least one processor, cause the position detection system to output the artificial sound when the elapsed time exceeds a threshold value, and not output the artificial sound when the elapsed time does not exceed the threshold value.

In the position detection system according to a seventh aspect of the present disclosure, the instructions, when executed by the at least one processor, cause the position detection system to output the artificial sound when the elapsed time is less than a threshold value, and not output the artificial sound when the elapsed time is not less than the threshold value.

In the position detection system according to an eighth aspect of the present disclosure, the instructions, when executed by the at least one processor, cause the position detection system to, while not outputting the artificial sound, output a sound effect for providing a representation effect or an operation effect.

In the position detection system according to a ninth aspect of the present disclosure, the execution reference time point is a time point of a start of the writing application, a time point when the writing application returns to a normal mode from a sleep mode during the execution of the writing application, or a time point when writing of contents is started during the execution of the writing application.

In the position detection system according to a tenth aspect of the present disclosure, the instructions, when executed by the at least one processor, cause the position detection system to receive a selection of a combination of the category and a material property of the stationery, output the artificial sound according to the selection of the combination that is received.

In the position detection system according to an eleventh aspect of the present disclosure, the material property includes hardness of a tip end portion of the stationery or viscosity of an adhering medium from the tip end portion.

In the position detection system according to a twelfth aspect of the present disclosure, the instructions, when executed by the at least one processor, cause the position detection system to output the artificial sound with a volume, a pitch, or a tone corresponding to the combination.

In the position detection system according to a thirteenth aspect of the present disclosure, the category includes a first category in which a frictional force against a predetermined target object is relatively large and a second category in which the frictional force is relatively small, and the output circuit outputs a first artificial sound when the category is the first category, and the instructions, when executed by the at least one processor, cause the position detection system to output a second artificial sound that is emphasized as compared with the first artificial sound, when the category is the second category.

In the position detection system according to a fourteenth aspect of the present disclosure, the first category includes a ballpoint pen or a pencil, and the second category includes a fountain pen or a writing brush.

In the position detection system according to a fifteenth aspect of the present disclosure, the stationery includes an erasing tool which, in operation, erases writing, and instructions, when executed by the at least one processor, cause the position detection system to output, as the artificial sound, an artificial erasing sound imitating an erasing sound occurring when the writing is erased by the erasing tool.

The position detection system according to a sixteenth aspect of the present disclosure, the instructions, when executed by the at least one processor, cause the position detection system to generate an artificial sound to imitate the sound occurring when the stationery is used, according to the selection of the combination that is received, and output, in response to the input operation performed by the electronic pen to indicate the position, the artificial sound.

In the position detection system according to a seventeenth aspect of the present disclosure, the at least one processor includes a first processor and a second processor, the first processor is disposed in the detecting circuit, the first processor, in operation, receives the selection of the category of the stationery to be imitated, the second processor is disposed in the electronic pen, and the second processor, in operation, outputs the artificial sound imitating the sound occurring when the stationery is used, according to the selection of the category that is received.

According to an eighteenth aspect of the present disclosure, there is provided an electronic pen capable of performing an input operation to indicate a position on an input surface of a touch sensor in which a plurality of sensor electrodes are arranged in a planar shape, the electronic pen including a processor, and a memory storing instructions that, when executed by the processor, cause the electronic pen to: obtain a selection of a category of a stationery to be imitated, detect a pen state representing a state of the electronic pen with respect to the input surface and an operation state representing a state of an operation of the electronic pen, and output, in response to the input operation performed by the electronic pen to indicate the position, an artificial sound imitating a sound occurring when the stationery is used, according to the selection of the category that is obtained.

In the electronic pen according to a nineteenth aspect of the present disclosure, the instructions, when executed by the processor, cause the electronic pen to, when the operation state is a pen-up state indicating that the electronic pen moves away from the input surface, change an output duration from a time point of detection of the pen-up state to a time point of stopping of the output of the artificial sound, based on the pen state.

In the electronic pen according to a twentieth aspect of the present disclosure, instructions that, when executed by the processor, cause the electronic pen to obtain an execution reference time point that is a time point related to execution of a writing application for performing writing with use of the electronic pen or an elapsed time from the execution reference time point, and switch whether or not to output the artificial sound or changes an output mode of the artificial sound according to the elapsed time.

According to the present disclosure, it is possible to make, by an artificial sound, a user feel as if the user were actually using the stationery to be imitated.

BRIEF DESCRIPTION OF THE SEVERAL VIEWS OF THE DRAWINGS

FIG. 4 is a diagram illustrating an example of a sound identification (ID) data table;

FIG. 6A is a conceptual diagram of assistance in explaining an artificial sound that is output according to a combination of a category and a material property of a writing tool as stationery;

FIG. 6B is a conceptual diagram of assistance in explaining an artificial sound that is output according to a combination of a category and a material property of a writing tool as stationery;

FIG. 7A is a conceptual diagram of assistance in explaining an artificial sound that is output according to a combination of a category and a material property of an erasing tool as stationery;

FIG. 7B is a conceptual diagram of assistance in explaining an artificial sound that is output according to a combination of a category and a material property of an erasing tool as stationery;

FIG. 11 is a diagram illustrating an example of an artificial sound generation data table;

DETAILED DESCRIPTION

Position detection systems and electronic pens according to various embodiments of the present disclosure will hereinafter be described with reference to the accompanying drawings. In order to facilitate the understanding of the description, elements having the same elements or the same functions in respective drawings are denoted by the same reference signs where possible, and repeated description thereof will be omitted.

First Embodiment

<General Configuration>

Figure 1:
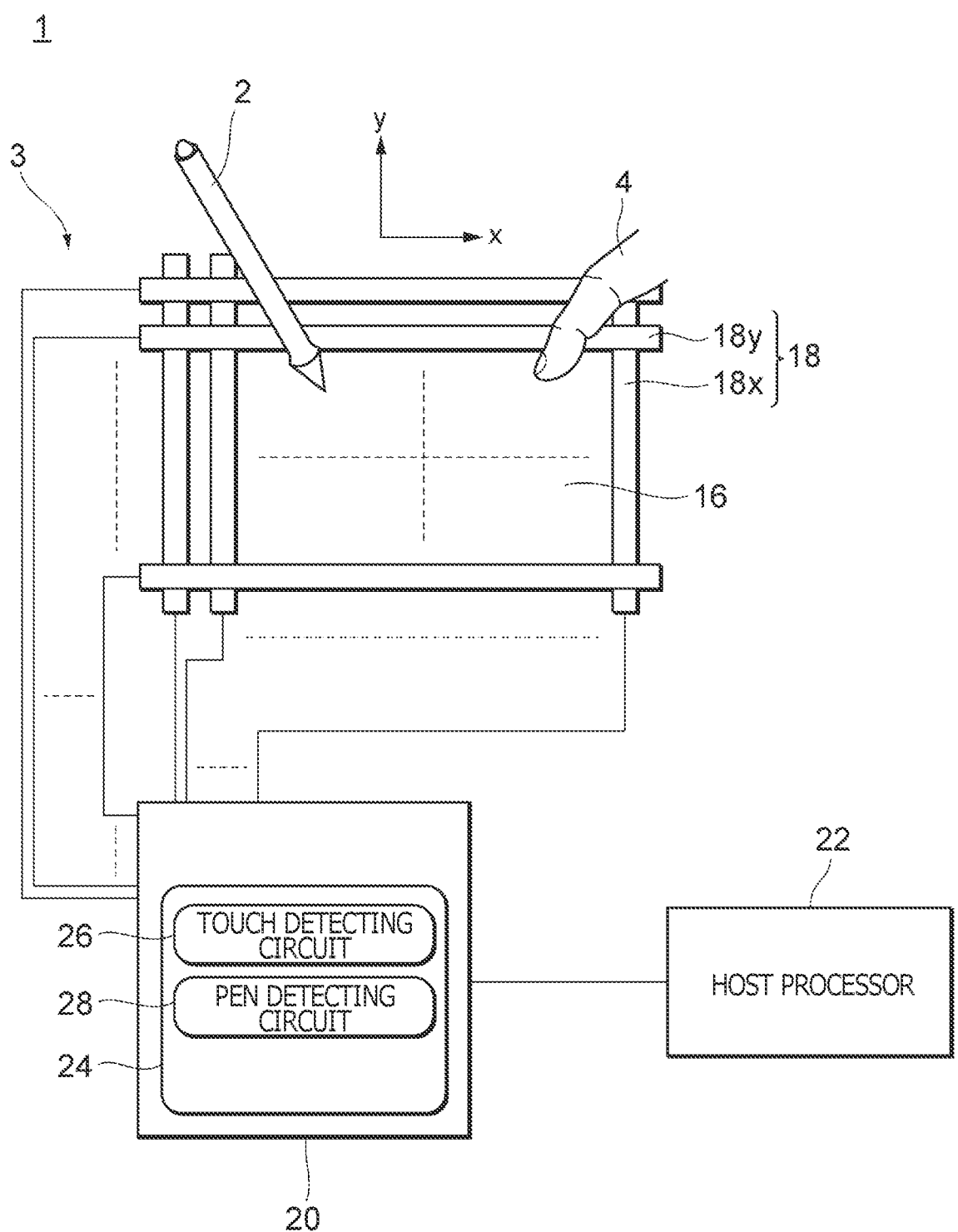
FIG. 1 is a diagram illustrating an example of a general configuration of a position detection system according to a first embodiment of the present disclosure.

FIG. 1 is a diagram illustrating an example of a general configuration of a position detection system 1 according to a first embodiment of the present disclosure. As illustrated in FIG. 1, the position detection system 1 according to the first embodiment includes an electronic pen 2 as a pen-type pointing device and an electronic apparatus 3 having a touch panel display.

The electronic pen 2 is an electronic pen operated by an active capacitive system. The electronic pen 2 will be referred to also as a "stylus." The electronic pen 2 is configured to be able to mutually transmit and receive signals to and from the electronic apparatus 3. In the following description, a signal transmitted from the electronic apparatus 3 to the electronic pen 2 will be referred to as an uplink signal, and a signal transmitted from the electronic pen 2 to the electronic apparatus 3 will be referred to as a downlink signal. Incidentally, the downlink signal will also be referred to as a pen signal. The electronic apparatus 3 includes, for example, a tablet terminal, a smart phone, or a personal computer. A user can write a drawing or a character on the electronic apparatus 3 by moving the electronic pen 2 while gripping the electronic pen 2 with one hand and pressing a pen tip of the electronic pen 2 against an input surface 16 of the electronic apparatus 3. In addition, by touching the input surface 16 with a finger 4 of the user, the user can perform a desired operation via a user control being displayed.

The electronic apparatus 3 includes a touch sensor 18, a touch IC 20 as a detecting circuit, and a host processor 22. The touch sensor 18 is a capacitive-type touch sensor, for example. The touch sensor 18 includes a plurality of sensor electrodes 18x and 18y arranged in a planar shape to be superposed on a display panel not illustrated. The sensor electrodes 18x detect a position on an X-axis. The sensor electrodes 18y detect a position on a Y-axis. An x-direction and a y-direction illustrated in FIG. 1 correspond to the X-axis and the Y-axis, respectively, of a rectangular coordinate system defined on the input surface 16 of the touch sensor 18. The input surface 16 of the touch sensor 18 is formed as, for example, a top surface of a planar member of glass or the like which is disposed on the touch sensor 18.

The sensor electrodes 18x in the shape of a band are disposed to extend in the y-direction and are arranged at equal intervals along the x-direction. The sensor electrodes 18y in the shape of a band are disposed as to extend in the x-direction and are arranged at equal intervals along the y-direction. Incidentally, in place of the mutual-capacitance-type sensor described above, the touch sensor 18 may be a self-capacitance-type sensor in which electrodes in the shape of a block are arranged two-dimensionally in a lattice manner.

Figure 3:
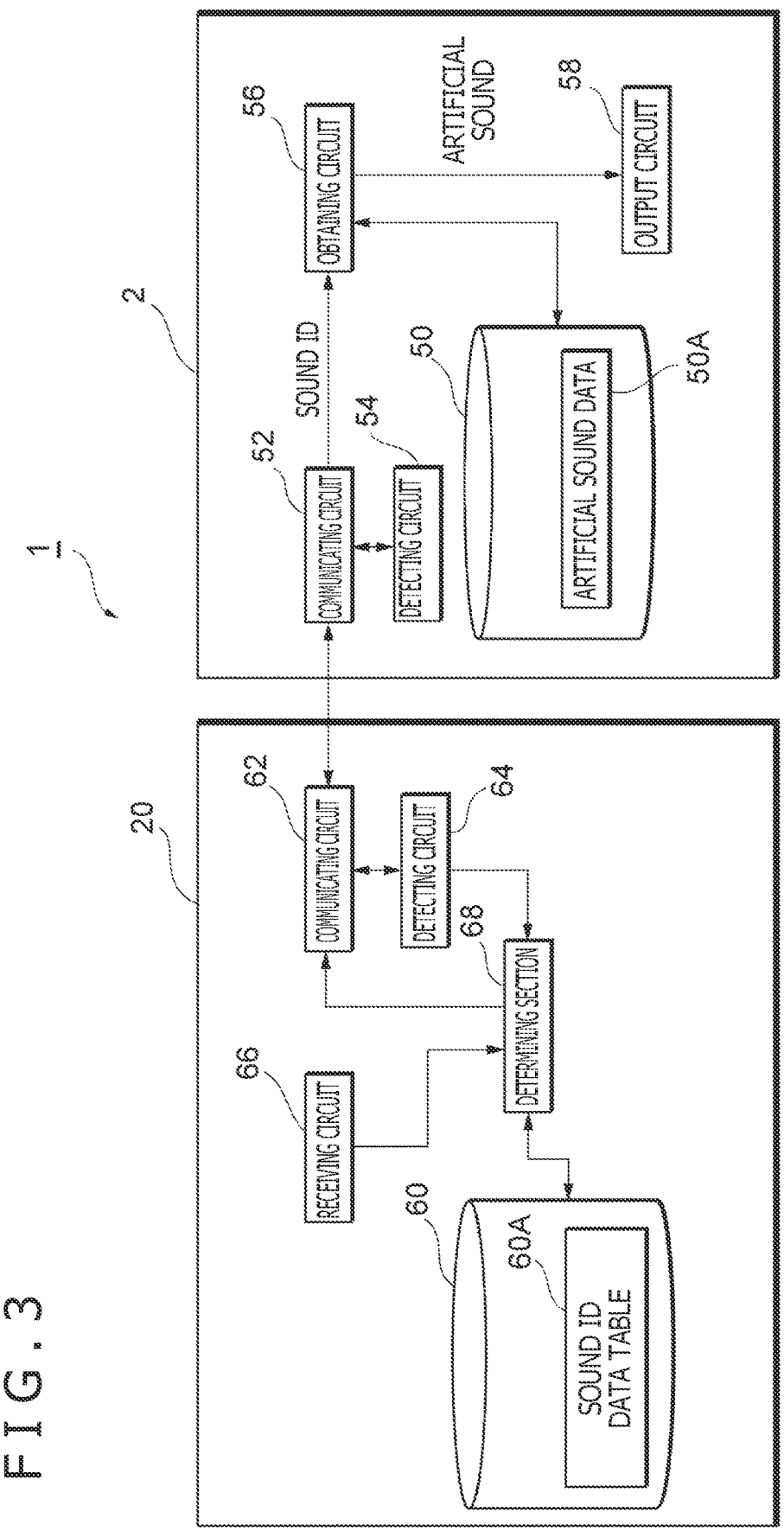
FIG. 3 is a functional block diagram illustrating an example of functional configurations of the electronic pen and a touch integrated circuit (IC) in FIG. 1.

The touch IC 20 is an integrated circuit internally having a memory (a read-only memory (ROM) and a random-access memory (RAM)), and a processor configured to be able to execute firmware 24 stored in the memory. A functional configuration of the touch IC 20, which will be described later with reference to FIG. 3, is implemented by executing the firmware 24 and thereby operating the respective circuit of the touch IC 20. The touch IC 20 is connected to each of the plurality of sensor electrodes 18x and 18y of the touch sensor 18.

The processor executing the firmware 24 performs scanning processing to read and process detection signals sequentially output from the respective sensor electrodes 18x and 18y. Thus, the processor executing the firmware 24 can implement a touch detecting function of detecting a position indicated by the finger 4 of the user on the input surface 16 and a pen detecting function of detecting a position indicated by the electronic pen 2 on the input surface 16. In other words, the touch IC 20 includes a touch detecting circuit 26 that performs the touch detecting function and a pen detecting circuit 28 that performs the pen detecting function. The touch IC 20 outputs data obtained by the touch detecting circuit 26 or the pen detecting circuit 28 to the host processor 22. In the following description, the position indicated by the electronic pen 2 will be referred to also as a "pen position."

The host processor 22 is a processor including a central processing unit (CPU) or a graphics processing unit (GPU). The host processor 22 reads a program from a memory not illustrated and executes the program to thereby perform, for example, processing of generating stroke data with the use of the data from the touch IC 20, performing rendering, and displaying the result as writing contents on the display.

<Hardware Configuration of Electronic Pen 2>

Figure 2:
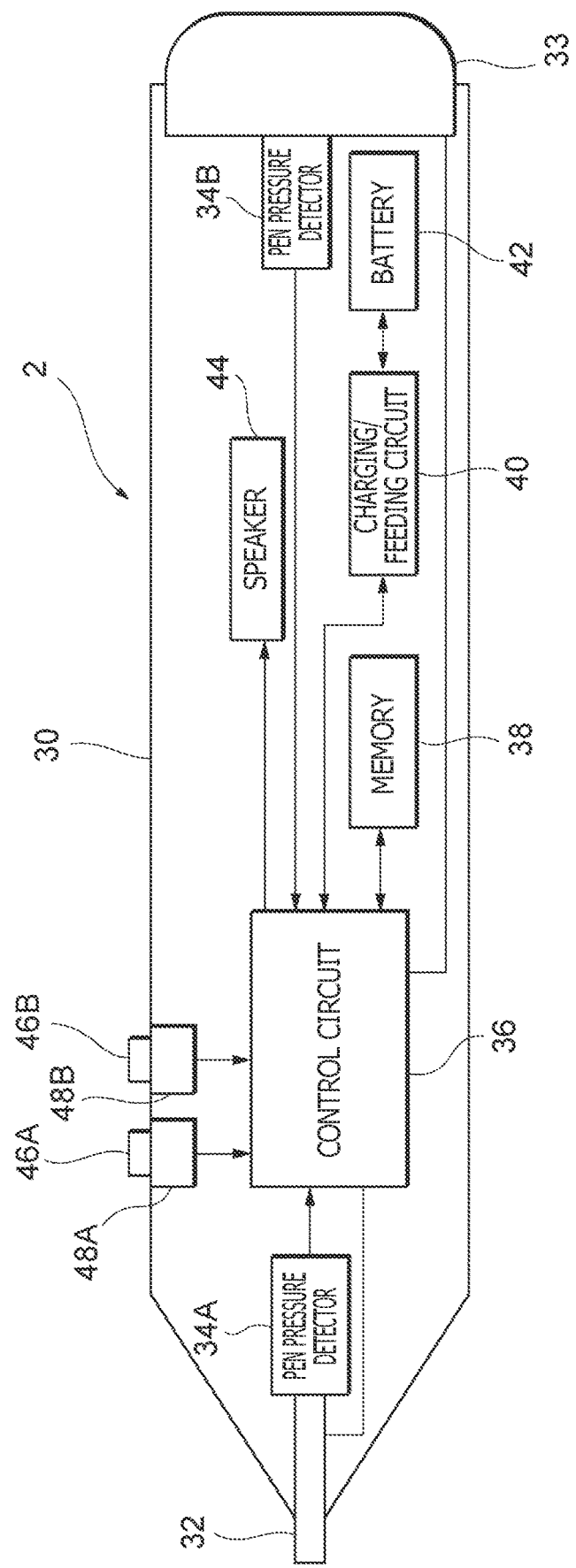
FIG. 2 is a diagram illustrating an example of a hardware configuration of an electronic pen in FIG. 1.

FIG. 2 is a diagram illustrating an example of a hardware configuration of the electronic pen 2 in FIG. 1. As illustrated in FIG. 2, the electronic pen 2 includes a casing 30, a tip electrode 32, a tail electrode 33, pen pressure detectors 34A and 34B, a control circuit 36, a memory 38, a charging/feeding circuit 40, a battery 42, a speaker 44, switch operating units 46A and 46B, and side switches 48A and 48B.

The casing 30 is a frame that houses internal components of the electronic pen 2. The casing 30 has a tubular shape. The tip electrode 32 is disposed at one end of the casing 30 and has a rod shape made of a conductive material. The tip electrode 32 is an electrode that outputs a downlink signal indicating that a pen function of the electronic pen 2 is to be used (writing is to be performed). The tip electrode 32 has one end attached to the casing 30 by being connected to the pen pressure detector 34A, and has the other end projecting from the casing 30 to form a pen tip.

The tail electrode 33 is disposed at the other end (opposite to the end at which the tip electrode 32 is disposed) of the casing 30 and has a hemispherical shape made of a conductive material. The tail electrode 33 is an electrode that outputs a downlink signal indicating that an eraser function of the electronic pen 2 is to be used (writing is to be erased). The tail electrode 33 has one end attached to the casing 30 by being connected to the pen pressure detector 34B, and has the other end projecting from the casing 30 to form a pen tip. In the following description, the pen tip formed by the tip electrode 32 and the pen tip formed by the tail electrode 33 will also collectively be referred to as a "pen tip."

The pen pressure detectors 34A and 34B detect the value of a pen pressure applied to the pen tip of the electronic pen 2. Each of the pen pressure detectors 34A and 34B includes a variable capacitance capacitor that changes in capacitance according to the pressing force of the tip electrode 32 or the tail electrode 33 to which the pen pressure is applied. That is, the capacitance of the variable capacitance capacitor included in each of the pen pressure detectors 34A and 34B changes according to the pen pressure applied to the tip electrode 32 or the tail electrode 33. Each of the pen pressure detectors 34A and 34B outputs the capacitance of the variable capacitance capacitor to the control circuit 36.

The control circuit 36 controls the respective parts of the electronic pen 2, such as the speaker 44 and the charging/feeding circuit 40. A functional configuration of the electronic pen 2, which will be described later with reference to FIG. 3, is implemented by executing a program stored in the memory 38 and thereby operating the respective parts of the electronic pen 2 under the control of the control circuit 36.

The control circuit 36 performs control related to the downlink signal from the electronic pen 2. The control circuit 36 performs control to output the downlink signal to the tip electrode 32 or the tail electrode 33 and transmit the downlink signal to the touch IC 20 through the tip electrode 32 or the tail electrode 33. The downlink signal includes a position signal and a data signal. The position signal is an unmodulated signal for detecting a position indicated by the electronic pen 2 (pen position) on the touch IC 20 side. On the other hand, the data signal is a signal obtained by modulating a carrier signal on the basis of various kinds of data retained within the electronic pen 2. The various kinds of data retained within the electronic pen 2 include the value of the pen pressure applied to the pen tip of the electronic pen 2, switch information indicating on/off states of the side switches 48A and 48B, a pen ID for identifying the electronic pen 2, and the like.

Specifically, the control circuit 36 outputs a signal based on a signal from an oscillator not illustrated, as the position signal, to the tip electrode 32 or the tail electrode 33. In addition, the control circuit 36 obtains the pen pressure value corresponding to the capacitance of the variable capacitance capacitor which is output from the pen pressure detector 34A or 34B. Then, the control circuit 36 outputs a data signal generated by modulating the frequency of the carrier signal or the like according to the pen pressure value, to the tip electrode 32 or the tail electrode 33. In addition, the control circuit 36 obtains the switch information indicating the on/off states of the side switches 48A and 48B, on the basis of on/off signals output from the side switches 48A and 48B. Then, the control circuit 36 outputs a data signal generated by modulating the frequency of the carrier signal according to the switch information, to the tip electrode 32 or the tail electrode 33.

The memory 38 is a nonvolatile storage unit including a semiconductor memory or the like. The memory 38 stores, for example, various kinds of programs necessary to perform processing in the electronic pen 2. In addition, the memory 38 stores the unique pen ID assigned to the electronic pen 2 in advance and various kinds of data necessary for the processing performed in the electronic pen 2.

Under the control of the control circuit 36, the charging/feeding circuit 40 is supplied with external power and charges the battery 42, or supplies power from the battery 42 to the respective parts of the electronic pen 2. The battery 42 is a secondary battery including a storage element.

The speaker 44 outputs a predetermined sound to the outside under the control of the control circuit 36. For example, in response to an operation of the electronic pen 2 for inputting a pen position, the speaker 44 outputs, to the outside, an artificial sound imitating a sound occurring when stationery to be imitated is used. It is to be noted that the speaker 44 is not limited to one being disposed inside the electronic pen 2, and may be disposed outside the electronic pen 2.

The switch operating units 46A and 46B and the side switches 48A and 48B implement functions corresponding to functions of a left click button and a right click button of what is called a mouse as a pointing device. The switch operating units 46A and 46B are operating buttons for the side switches 48A and 48B. The switch operating units 46A and 46B are disposed on a side surface of the casing 30. The side switches 48A and 48B output signals (on/off signals) indicating the presence or absence of operations of the corresponding side switches 48A and 48B, to the control circuit 36, according to the presence or absence of operations of the switch operating units 46A and 46B made by the user.

It is to be noted that the configuration of the electronic pen 2 is not limited to the configuration illustrated in FIG. 2 and described with reference thereto. For example, the electronic pen 2 may include a ring electrode placed on a side opposite to the pen tip side with respect to the tip electrode 32 or the tail electrode 33.

<Functional Configuration of Electronic Pen 2 and Touch IC 20>

FIG. 3 is a functional block diagram illustrating an example of functional configurations of the electronic pen 2 and the touch IC 20 in FIG. 1. As illustrated in FIG. 3, first, the electronic pen 2 includes, as the functional configuration thereof, a storage device 50, a communicating circuit 52, a detecting circuit 54, an obtaining circuit 56, and an output circuit 58. Incidentally, part or the whole of the functional configuration included in the electronic pen 2 may be included in the touch IC 20.

The storage device 50 stores artificial sound data 50A. The artificial sound data 50A is data representing artificial sounds imitating sounds occurring when stationery to be imitated is used, and is associated with sound identifiers (IDs) for identifying the artificial sounds. The artificial sound data 50A is, for example, set and stored in advance by a designer or the like. The stationery includes writing tools for writing or erasing tools for erasing the writing. In a case where the stationery is a writing tool, the artificial sound is an artificial writing sound imitating a writing sound occurring when writing is performed with the use of the writing tool. In a case where the stationery is an erasing tool, the artificial sound is an artificial erasing sound imitating an erasing sound occurring when writing is erased with the use of the erasing tool.

The artificial sound data 50A is data regarding an artificial sound that is generated in advance for each combination of a category and a material property of the stationery in such a manner as to have a volume, a pitch, or a tone corresponding to the combination. The volume is the magnitude of sound of a sound wave. The pitch is the quantity of frequency of the sound wave. The tone represents a difference in quality of the sound wave and is the waveform of the sound wave. The artificial sound data 50A is, for example, data obtained by recording, for each combination of a category and a material property of stationery, a sound occurring when the stationery is used in a predetermined usage state. Incidentally, the artificial sound data 50A may be artificial sound data obtained by processing the recorded data.

Categories of the stationery are groups divided according to types of the stationery. The categories include, for example, a pencil, a ballpoint pen, a fountain pen, and a writing brush which are writing tools, and an eraser, a sand eraser, a correction fluid (pen), and a correction fluid (brush) which are erasing tools. In addition, the categories of the stationery include a first category in which a frictional force (coefficient of dynamic friction) against a predetermined target object is relatively large and a second category in which the frictional force is relatively small. The predetermined target object includes, for example, paper on which to perform writing. Stationery in the first category has a pen tip that is less likely to bend and slide, and makes a louder actual sound while being used than stationery in the second category. The first category includes, for example, a pencil, a ballpoint pen, an eraser, a sand eraser, a correction fluid (pen), and the like. On the other hand, the stationery in the second category has a pen tip that is more likely to bend and slide, and makes a smaller actual sound while being used than the stationery in the first category. The second category includes, for example, a fountain pen, a writing brush, a correction fluid (brush), and the like.

A material property of the stationery is a property of a material included in the stationery, and particularly is a material property of part of the stationery which is used on the target object such as paper. In a case where a category of stationery is a pencil, for example, the material property of the pencil represents the hardness (B, H) or the like of a core constituting the pen tip of the pencil. In addition, in a case where a category of stationery is such a type that has ink coming out of the pen tip, for example, a ballpoint pen, a correction fluid, or a fountain pen, the material property of this type represents the viscosity (water-based or oil-based) or the like of the ink from the pen tip. That is, the material property of the stationery includes the hardness of a tip end portion of the stationery or the viscosity of an adhering medium from the tip end portion. In addition, in a case where a category of stationery is such a type that erases writing by a frictional force, for example, an eraser or a sand eraser, the material property of this type represents the material property (plastic, rubber, or silica sand) or the like of a main body of the eraser or the sand eraser. In addition, in a case where a category of stationery is a writing brush, the material property of the writing brush represents the material property (soft hair or stiff bristle) or the like of the point as a pen tip of the writing brush.

The communicating circuit 52 is communicatably connected to a communicating circuit 62 of the touch IC 20 through the tip electrode 32 or the tail electrode 33. The communicating circuit 52 receives an uplink signal from the communicating circuit 62 and outputs the received uplink signal to the detecting circuit 54. In addition, the communicating circuit 52 transmits, to the communicating circuit 62, a downlink signal output from the detecting circuit 54 according to the uplink signal. In addition, the communicating circuit 52 receives a sound ID from the communicating circuit 62 and outputs the received sound ID to the obtaining circuit 56. In addition, when the communicating circuit 52 receives an artificial sound output time from the communicating circuit 62, the communicating circuit 52 outputs the received output time to the output circuit 58.

The detecting circuit 54 detects the downlink signal according to the uplink signal from the communicating circuit 52 and outputs the detected downlink signal to the communicating circuit 52.

The obtaining circuit 56 obtains data regarding an artificial sound on the basis of the sound ID output from the communicating circuit 52. For example, the obtaining circuit 56 obtains data regarding an artificial sound corresponding to the sound ID output from the communicating circuit 52, from among pieces of artificial sound data 50A in the storage device 50. The obtaining circuit 56 outputs the obtained data regarding the artificial sound to the output circuit 58.

In response to the operation of the electronic pen 2 for inputting a pen position, the output circuit 58 outputs an artificial sound corresponding to a sound of stationery during use, according to a selected combination of a category and a material property of the stationery. The selection of the combination is received by a receiving circuit 66 of the touch IC 20. Specifically, the output circuit 58 outputs the artificial sound obtained by the obtaining circuit 56 to the outside from the speaker 44.

The output circuit 58 outputs the artificial sound with a volume, a pitch, or a tone corresponding to the combination of the category and the material property of the stationery. In a case where the category of the stationery is a pencil, for example, the output circuit 58 outputs an artificial sound that is generated with a different volume, pitch, or tone according to whether the hardness of the core of the pencil is B or H. In addition, in a case where the category of the stationery is a ballpoint pen, the output circuit 58 outputs an artificial sound that is generated with a different volume, pitch, or tone according to whether the viscosity of the ink of the ballpoint pen is water-based or oil-based.

In addition, the output circuit 58 outputs an artificial sound corresponding to a pen state of the electronic pen 2. The pen state of the electronic pen 2 represents a state with respect to the input surface 16 and is related to the presence or absence or a degree of contact with the input surface 16. The pen state of the electronic pen 2 includes, for example, a pen pressure, a posture, or a movement of the electronic pen 2. The pen pressure of the electronic pen 2 is a pen pressure applied to the pen tip of the electronic pen 2. The posture of the electronic pen 2 is a pen inclination of the electronic pen 2 with respect to the input surface 16 and is an angle formed between a normal to the input surface 16 and the axis of the electronic pen 2. The movement of the electronic pen 2 is a speed or acceleration of the electronic pen 2 on the input surface 16. The artificial sound corresponding to the pen state is an artificial sound having a volume, a pitch, or a tone corresponding to the pen state and is an artificial sound imitating a sound occurring when the stationery is used in a usage state corresponding to the pen pressure, the posture, or the movement indicated by the pen state.

In addition, the output circuit 58 outputs a first artificial sound in a case where the category of the stationery is the first category, and the output circuit 58 outputs a second artificial sound that is emphasized as compared with the first artificial sound, in a case where the category of the stationery is the second category. That is, even in the same pen state, the artificial sound in the second category is output in such a manner as to be emphasized as compared with the artificial sound in the first category. For example, in the case where the category of the stationery is the second category, the second artificial sound is emphasized by increasing the volume or the like of the artificial sound corresponding to the pen state, and is then output. In addition, for example, in the case where the category of the stationery is the second category, the second artificial sound which corresponds to an emphasized pen state may be output. The emphasized pen state represents a state in which a pen detection value indicated by the pen state is increased by a predetermined value.

In addition, the output circuit 58 outputs an artificial sound on the basis of a pen state that differs depending on an operation state of the electronic pen 2. The operation state of the electronic pen 2 represents a state of the operation of the electronic pen 2 and includes, for example, a pen-down state, a pen movement state, a pen-up state, a hovering state, and the like. The pen-down state indicates that the electronic pen 2 comes into contact with the input surface 16. The pen movement state indicates that the electronic pen 2 moves on the input surface 16. The pen-up state indicates that the electronic pen 2 that has been in contact with the input surface 16 moves away from the input surface 16. The hovering state indicates that the electronic pen 2 is away from the input surface 16.

For example, when the operation state of the electronic pen 2 is a pen-down state, the output circuit 58 outputs an artificial sound on the basis of a pen pressure as the pen state. On the other hand, when the operation state of the electronic pen 2 is a pen movement state, the output circuit 58 outputs an artificial sound on the basis of a posture or a movement as the pen state. When the operation state is a pen movement state, in particular, it is preferable to output the artificial sound on the basis of acceleration as the pen state.

In addition, the output circuit 58 stops the output of the artificial sound when the operation state of the electronic pen 2 is a pen-up state. At this time, the output circuit 58 changes an output duration from a time point of detection of the pen-up state to a time point of stopping of the output of the artificial sound (the output duration will hereinafter be referred to as a "reverberation time") on the basis of the pen state of the electronic pen 2. That is, the output circuit 58 changes the timing of stopping of the output of the artificial sound, according to a timing when the electronic pen 2 moves away from the input surface 16.

The timing when the electronic pen 2 moves away from the input surface 16 represents a length of time (speed) from a time point immediately before the electronic pen 2 moves away from the input surface 16 to a time point at which the electronic pen 2 is completely separated from the input surface 16. In the following description, this timing will also be referred to as a "pen-up timing." For example, a time point immediately before the electronic pen 2 moves away from the input surface 16 represents a time point at which the pen pressure value becomes equal to or less than a threshold value close to 0, and a time point at which the electronic pen 2 is completely separated from the input surface 16 represents a time point at which the pen pressure value becomes 0. That is, the pen-up timing represents a length of time from the time point at which the pen pressure value becomes equal to or less than the threshold value close to 0 to the time point at which the pen pressure value becomes 0.

The pen-up timing is calculated, for example, on the basis of acceleration (amount of change in speed per unit time) of the electronic pen 2 that is about to move away from the input surface 16. For example, the larger the acceleration is, the shorter (faster) the pen-up timing is. On the other hand, the smaller the acceleration is, the longer (slower) the pen-up timing is. For example, the output circuit 58 changes the reverberation time according to whether the pen-up timing is long or short. As the pen-up timing becomes longer, the output circuit 58 outputs the artificial sound with a longer reverberation time and then stops the output. Incidentally, when the operation state of the electronic pen 2 is a hovering state, the output circuit 58 disables the output of the artificial sound, that is, does not output the artificial sound.

Next, the touch IC 20 includes, as the functional configuration thereof, a storage device 60, the communicating circuit 62, a detecting circuit 64, the receiving circuit 66, and a determining circuit 68. Incidentally, part or the whole of the functional configuration included in the touch IC 20 may be included in the electronic pen 2.

The storage device 60 stores sound IDs in association with categories and material properties of stationery. For example, the storage device 60 stores a sound ID data table 60A.

FIG. 4 is a diagram illustrating an example of the sound ID data table 60A. As illustrated in FIG. 4, the sound ID data table 60A stores the sound IDs in association with information indicating the categories of the stationery, information indicating the material properties of the stationery, and information indicating the magnitude of pen detection values indicated by pen states. The sound ID data table 60A is, for example, set and stored in advance by a designer or the like.

Described with reference to FIG. 3 again, the communicating circuit 62 is communicatably connected to the communicating circuit 52 of the electronic pen 2 through the sensor electrodes 18*x* and 18*y*. The communicating circuit 62 transmits an uplink signal generated by the detecting circuit 64 to the communicating circuit 52. The uplink signal is a signal for synchronizing the electronic pen 2 with the electronic apparatus 3 and transmitting, to the electronic pen 2, a command indicating the contents of data to be transmitted. In addition, the communicating circuit 62 receives a downlink signal from the communicating circuit 52 and outputs the received downlink signal to the detecting circuit 64. In addition, the communicating circuit 62 transmits a sound ID and a reverberation time that are determined by the determining circuit 68, to the communicating circuit 52.

The detecting circuit 64 generates the uplink signal and outputs the uplink signal to the communicating circuit 62. In addition, the detecting circuit 64 detects the downlink signal output from the communicating circuit 62, as a result of global scanning or sector scanning. The global scanning refers to scanning all of the sensor electrodes 18*x* and 18*y* constituting the touch sensor 18. The sector scanning refers to scanning only a predetermined number of sensor electrodes 18*x* and 18*y* that are located at or in the vicinity of an immediately prior pen position among the plurality of sensor electrodes 18*x* and 18*y* constituting the touch sensor 18.

The detecting circuit 64 detects the coordinates of a pen position on the basis of the downlink signal. In addition, the detecting circuit 64 detects the pen state of the electronic pen 2 on the basis of the downlink signal. For example, the detecting circuit 64 also detects the pen pressure of the electronic pen 2 by demodulating a data signal included in the downlink signal. In addition, the detecting circuit 64 detects the speed of the electronic pen 2 by performing calculation according to an expression [amount of shift in coordinates of pen position/sampling time]. In addition, the detecting circuit 64 detects the acceleration of the electronic pen 2 by performing calculation according to an expression

[amount of shift in speed on input surface 16 of electronic pen 2/sampling time]. In addition, the detecting circuit 64 detects a pen inclination by detecting the coordinates of two pen positions on the basis of each of the downlink signals transmitted from the tip electrode 32 or the tail electrode 33 and from the ring electrode not illustrated and performing calculation on the basis of a distance between these two coordinates. The detecting circuit 64 outputs information indicating the detected pen state to the determining circuit 68 and the host processor 22.

In addition, the detecting circuit 64 detects the operation state of the electronic pen 2. For example, the detecting circuit 64 detects the operation state of the electronic pen 2 on the basis of whether or not the pen pressure value of the electronic pen 2 is equal to or more than a threshold value. The detecting circuit 64 detects a pen-up state when the pen pressure value changes from a value larger than 0 to 0, for example. Incidentally, the detecting circuit 64 may detect a pen-up state not only when the pen pressure value changes to 0 but also when the pen pressure value changes to a value equal to or less than the threshold value close to 0, for example. When the pen pressure value thus changes to a value equal to or less than the threshold value close to 0, the electronic pen 2 is about to move away from the input surface 16, and the electronic pen 2 may be considered to be separated from the input surface 16 even when the electronic pen 2 is not completely separated from the input surface 16. In addition, the detecting circuit 64 detects a pen-down state when the pen pressure value changes from 0 to a value larger than 0. In addition, the detecting circuit 64 detects a pen movement state while the pen pressure value is a value larger than 0. In addition, the detecting circuit 64 detects a hovering state while the detected pen pressure value is 0.

The receiving circuit 66 receives a selection of a combination of a category and a material property of stationery to be imitated. The user can input the selection of the combination on a selection screen 100 (see FIG. 6A and the like) displayed on the touch panel display of the electronic apparatus 3 by the host processor 22. When the selection of the combination is input, the host processor 22 outputs information indicating the input combination to the receiving circuit 66. The receiving circuit 66 thus receives the selection of the combination of the category and the material property of the stationery. The receiving circuit 66 outputs information indicating the selected combination thus received, to the determining circuit 68.

The determining circuit 68 determines a sound ID for obtaining an artificial sound and outputs the determined sound ID to the communicating circuit 62. The determining circuit 68 determines the sound ID on the basis of the selected combination which is received by the receiving circuit 66. Specifically, the determining circuit 68 refers to the sound ID data table 60A and extracts a sound ID corresponding to the selected combination which is received by the receiving circuit 66. For example, in a case where the selected combination which is received by the receiving circuit 66 is a combination of a "category: pencil" and a "material property: B," a sound ID "S11" or "S12" associated with this combination is extracted.

In addition, the determining circuit 68 determines a sound ID corresponding to the pen state output from the detecting circuit 64. For example, the determining circuit 68 determines a sound ID corresponding to the pen detection value indicated by the pen state output from the detecting circuit 64. The determining circuit 68 determines whether or not the pen detection value indicated by the pen state output from the detecting circuit 64 is equal to or more than a threshold value for determining the magnitude of the pen detection value. When the pen detection value is equal to or more than the threshold value, it is determined that the pen detection value is large. In this case, the determining circuit 68 extracts a sound ID associated with "large," which indicates that the pen detection value is large, in the sound ID data table 60A. When the pen detection value is less than the threshold value for determining the magnitude of the pen detection value, on the other hand, it is determined that the pen detection value is small. In this case, the determining circuit 68 extracts a sound ID associated with "small," which indicates that the pen detection value is small, in the sound ID data table 60A.

In addition, the determining circuit 68 determines a sound ID corresponding to the pen state, when the selected category of the stationery which is received by the receiving circuit 66 is the first category. On the other hand, the determining circuit 68 determines a sound ID corresponding to the emphasized pen state, when the selected category of the stationery is the second category. For example, when the stationery category is the second category, the determining circuit 68 extracts a sound ID corresponding to the magnitude of a pen detection value indicated by the emphasized pen state in the sound ID data table 60A. For example, the determining circuit 68 calculates an emphasized value which is obtained by increasing the pen detection value indicated by the pen state output from the detecting circuit 64, and determines whether or not the emphasized value is equal to or more than the threshold value. When the emphasized value is equal to or more than the threshold value, it is determined that the emphasized value is large. In this case, the determining circuit 68 extracts a sound ID associated with "large," which indicates that the pen detection value is large, in the sound ID data table 60A. When the emphasized value is less than the threshold value, on the other hand, it is determined that the emphasized value is small. In this case, the determining circuit 68 extracts a sound ID associated with "small," which indicates that the pen detection value is small, in the sound ID data table 60A.

In addition, the determining circuit 68 determines a sound ID on the basis of the pen state that differs depending on the operation state of the electronic pen 2. For example, when the operation state of the electronic pen 2 is a pen-down state, the determining circuit 68 determines a sound ID on the basis of the pen pressure of the electronic pen 2 as the pen state. When the operation state of the electronic pen 2 is a pen movement state, on the other hand, the determining circuit 68 determines a sound ID on the basis of the posture or movement of the electronic pen 2 as the pen state.

In addition, when a pen-up state is detected by the detecting circuit 64, the determining circuit 68 determines a reverberation time according to the pen-up timing. For example, the determining circuit 68 calculates the pen-up timing on the basis of acceleration of the electronic pen 2 that is about to move away from the input surface 16, and calculates the reverberation time on the basis of a result of the calculation. For example, a reference time corresponding to a reference timing is set in advance. The determining circuit 68 calculates the reverberation time such that the ratio of the reverberation time to the reference time is substantially the same as the ratio of the pen-up timing to the reference timing. In addition, for example, a plurality of reverberation times associated with lengths of pen-up timings may be set in advance. The determining circuit 68 may select any one of the plurality of reverberation times set in advance on the basis of the length of the pen-up timing. The determining circuit 68 outputs the determined reverberation time to the communicating circuit 62.

<Operation of Position Detection System 1>

Figure 5:
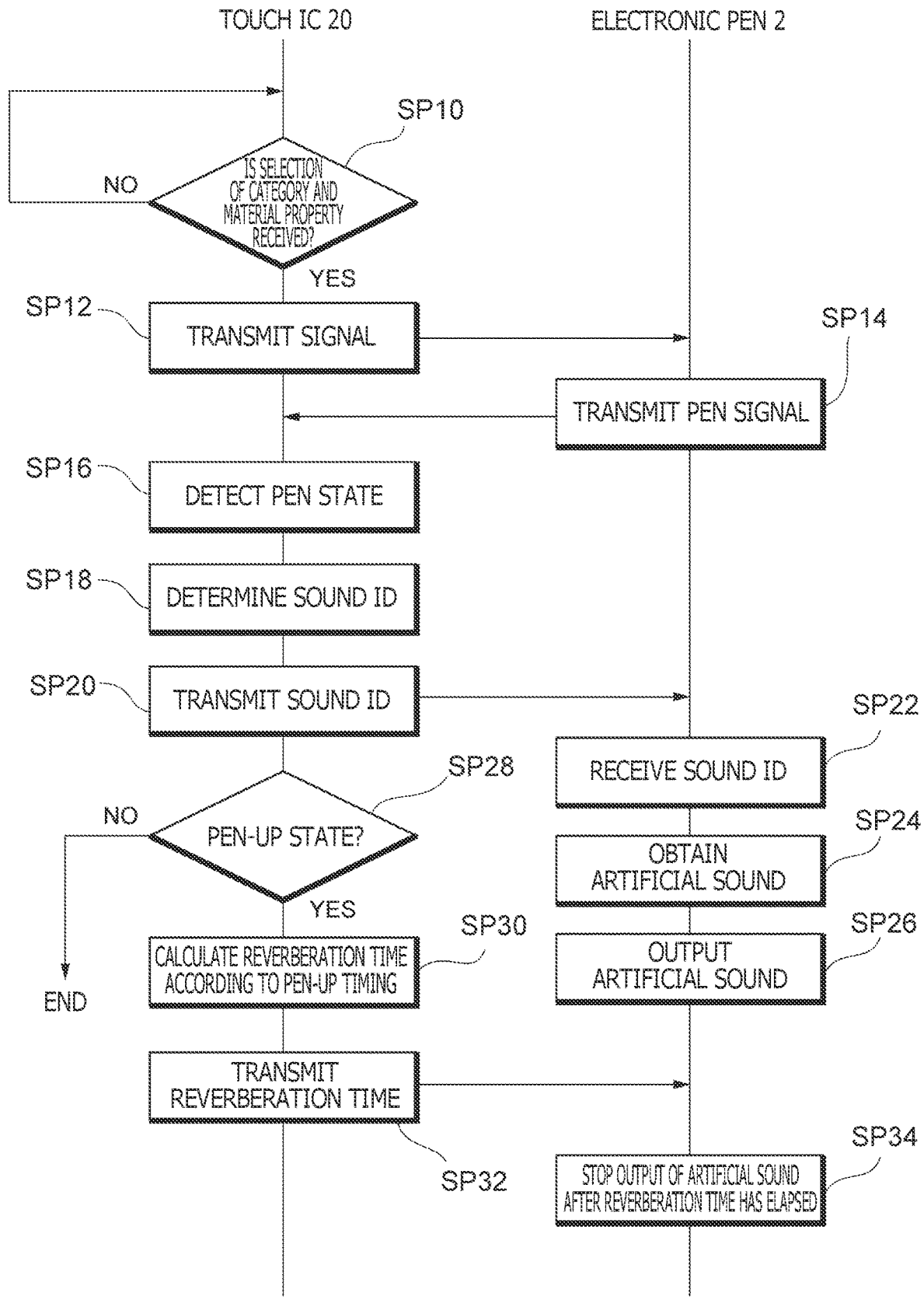
FIG. 5 is a flowchart illustrating an example of a flow of the operation of the position detection system according to the first embodiment of the present disclosure.

The operation of the position detection system 1 will next be described with reference to FIG. 5. FIG. 5 is a flowchart illustrating an example of a flow of the operation of the position detection system 1. For example, the flowchart illustrated in FIG. 5 is started when the host processor 22 displays the selection screen 100 (see FIG. 6A and the like) on the touch panel display of the electronic apparatus 3 in response to an operation made by the user using a writing application (or a drawing application) executed by the host processor 22.

As illustrated in FIG. 6A, the selection screen 100 displayed on the touch panel display of the electronic apparatus 3 includes a category selecting part 102 that receives a selection of a category of stationery through a radio button or the like, and a material property selecting part 104 that receives a selection of a material property of stationery through a radio button or the like. For example, such a selection screen 100 can receive a selection of a category of stationery in the category selecting part 102 through an input operation made by the user, and receive a selection of a material property of stationery in the material property selecting part 104 through an input operation made by the user. When the selections input by the user are received, the host processor 22 obtains information indicating a combination of the selected stationery category and the selected stationery material property which are received by the selection screen 100. Then, the information indicating the combination is output from the host processor 22 to the receiving circuit 66.

(SP10)

The receiving circuit 66 of the touch IC 20 determines whether or not a selection of a combination of a category and a material property of stationery is received. The receiving circuit 66 determines whether or not a selection of a combination of a category and a material property of stationery is received, on the basis of whether or not information indicating the combination is received from the host processor 22. When the information indicating the combination is output from the host processor 22, that is, the result of the determination is affirmative, the processing proceeds to SP12. When the information indicating the combination is not output from the host processor 22, that is, the result of the determination is negative, the processing of SP10 is repeated until an operation for changing the selection screen 100 to another screen is received from the user, for example.

(SP12)

The communicating circuit 62 of the touch IC 20 transmits an uplink signal generated by the detecting circuit 64 of the touch IC 20 to the communicating circuit 52 of the electronic pen 2. Then, the processing proceeds to SP14.

(SP14)

The communicating circuit 52 of the electronic pen 2 receives the uplink signal transmitted at SP12. Then, the detecting circuit 54 of the electronic pen 2 detects a downlink signal according to the uplink signal. Then, the communicating circuit 52 transmits the detected downlink signal (pen signal) to the communicating circuit 62 of the touch IC 20. Then, the processing proceeds to SP16. Incidentally, the processing of SP12 and SP14 is repeated periodically, for example.

(SP16)

The communicating circuit 62 of the touch IC 20 receives the downlink signal transmitted in the processing of SP14. Then, on the basis of the downlink signal, the detecting circuit 64 of the touch IC 20 detects the coordinates of the pen position and the pen state of the electronic pen 2. In addition, the detecting circuit 64 detects the operation state of the electronic pen 2 on the basis of the pen pressure value. Then, the processing proceeds to SP18.

(SP18)

The determining circuit 68 of the touch IC 20 refers to the sound ID data table 60A and extracts a sound ID corresponding to the selected combination which is received in the processing of SP10 and the pen state detected in the processing of SP16. At this time, the determining circuit 68 uses the pen pressure as the pen state when the operation state detected in the processing of SP16 is a pen-down state. On the other hand, the determining circuit 68 uses the pen inclination, the speed, or the acceleration as the pen state when the operation state is a pen movement state. In addition, the determining circuit 68 extracts a sound ID corresponding to the pen state, when the stationery category included in the selected combination which is received in the processing of SP10 is the first category. On the other hand, the determining circuit 68 extracts a sound ID corresponding to the emphasized pen state, when the stationery category included in the selected combination is the second category. Then, the processing proceeds to SP20.

(SP20)

The communicating circuit 62 of the touch IC 20 transmits the sound ID determined in the processing of SP18 to the communicating circuit 52 of the electronic pen 2. Then, the processing proceeds to SP22.

(SP22)

The communicating circuit 52 of the electronic pen 2 receives the sound ID. Then, the processing proceeds to SP24.

(SP24)

The obtaining circuit 56 of the electronic pen 2 obtains an artificial sound corresponding to the sound ID received in the processing of SP22, from among pieces of artificial sound data 50A. Then, the processing proceeds to SP26.

(SP26)

The output circuit 58 of the electronic pen 2 outputs the artificial sound obtained in the processing of SP24 to the outside from the speaker 44. The output circuit 58 continues outputting the artificial sound while the pen position is being detected. The output circuit 58 stops the output of the artificial sound when the pen position is no longer detected. Then, the processing proceeds to SP28.

(SP28)

The determining circuit 68 of the touch IC 20 determines whether or not a pen-up state is detected in the processing of SP16. When a pen-up state is detected, that is, the result of the determination is affirmative, the processing proceeds to SP30. When no pen-up state is detected, that is, the result of the determination is negative, the series of processing illustrated in FIG. 5 is ended.

(SP30)

The determining circuit 68 calculates a pen-up timing on the basis of the acceleration of the electronic pen 2 that is about to move away from the input surface 16, and calculates a reverberation time corresponding to the pen-up timing. Then, the processing proceeds to SP32.

(SP32)

The communicating circuit 62 of the touch IC 20 transmits the reverberation time calculated in the processing of SP30 to the communicating circuit 52 of the electronic pen 2. Then, the processing proceeds to SP34.

(SP34)

The communicating circuit 52 of the electronic pen 2 receives the reverberation time transmitted in the processing of SP32. Then, the output circuit 58 of the electronic pen 2 stops the output of the artificial sound being output in the processing of SP26, after the reverberation time received by the communicating circuit 52 has elapsed.

This ends the series of processing illustrated in FIG. 5.

<Actions and Effects>

As described above, the position detection system 1 according to the first embodiment includes the electronic pen 2 and the touch IC 20 (detecting circuit) configured to detect a position indicated by the electronic pen 2 on the input surface 16 of the touch sensor 18 in which the plurality of sensor electrodes 18x and 18y are arranged in a planar shape. The position detection system 1 further includes the receiving circuit 66 configured to receive a selection of a category of stationery to be imitated, and the output circuit 58 configured to output, in response to an input operation performed by the electronic pen 2 to indicate the position, an artificial sound according to the selected category of the stationery which is received by the receiving circuit 66, the artificial sound imitating a sound occurring when the stationery is used. In addition, the receiving circuit 66 receives a selection of a combination of the category of the stationery and a material property of the stationery, and the output circuit 58 outputs the artificial sound according to the selected combination which is received by the receiving circuit 66.

According to this configuration, the artificial sound corresponding to the combination of the category and the material property of the stationery to be imitated is output. Hence, the artificial sound can give the user the feel of use of the stationery that is unique to the stationery and that is indicated by a combination of a predetermined category and a predetermined material property (a writing feel in a case of a writing tool or an erasing feel in a case of an erasing tool). That is, the artificial sound can make the user feel as if the user were actually using the stationery to be imitated.

FIG. 6A and FIG. 6B are each a conceptual diagram of assistance in explaining an artificial sound that is output according to a combination of a category and a material property of a writing tool as stationery. On the selection screen 100 illustrated in FIG. 6A, input operations are made by the user to select a "pencil" in the category selecting part 102 and select "B" in the material property selecting part 104. In this case, a writing tool indicated by a combination of the category "pencil" and the material property "B" is selected, and an artificial sound 120 imitating the writing sound of the writing tool (pencil having a core hardness of B) indicated by this combination is output from the electronic pen 2. Consequently, the user can be given a soft writing feel.

On the other hand, on the selection screen 100 illustrated in FIG. 6B, input operations are made by the user to select a "pencil" in the category selecting part 102 and select "H" in the material property selecting part 104. In this case, a writing tool indicated by a combination of the category "pencil" and the material property "H" is selected, and an artificial sound 120 imitating the writing sound of the writing tool (pencil having a core hardness of H) indicated by this combination is output from the electronic pen 2. Consequently, the user can be given a hard writing feel. As described above, it is possible to give the user different writing feels according to combinations of categories and material properties of writing tools.

In addition, FIG. 7A and FIG. 7B are each a conceptual diagram of assistance in explaining an artificial sound that is output according to a combination of a category and a material property of an erasing tool as stationery. On the selection screen 100 illustrated in FIG. 7A, input operations are made by the user to select "eraser" in the category selecting part 102 and select "plastic" in the material property selecting part 104. In this case, an erasing tool indicated by a combination of the category "eraser" and the material property "plastic" is selected, and an artificial sound 120 imitating the erasing sound of the erasing tool (eraser made of plastic) indicated by this combination is output from the electronic pen 2. Consequently, the user can be given a soft erasing feel.

On the other hand, on the selection screen 100 illustrated in FIG. 7B, input operations are made by the user to select a "sand eraser" in the category selecting part 102 and select "silica sand" in the material property selecting part 104. In this case, an erasing tool indicated by a combination of the category "sand eraser" and the material property "silica sand" is selected, and an artificial sound 120 imitating the erasing sound of the erasing tool (sand eraser including silica sand) indicated by this combination is output from the electronic pen 2. Consequently, the user can be given a hard erasing feel. Thus, the user can be given different erasing feels according to combinations of categories and material properties of erasing tools.

In addition, in the first embodiment, the material property includes the hardness of a tip end portion of the stationery or the viscosity of an adhering medium from the tip end portion. According to this configuration, in a case where the category of the stationery is a pencil, for example, an artificial sound corresponding to the hardness of a core as the tip end portion of the pencil can be output, and in a case where the category of the stationery is a ballpoint pen, for example, an artificial sound corresponding to the viscosity of ink from a pen tip as the tip end portion of the ballpoint pen can be output.

In addition, in the first embodiment, the output circuit 58 outputs the artificial sound with a volume, a pitch, or a tone corresponding to the combination. According to this configuration, by changing the volume, the pitch, or the tone, the user can appropriately be given the feel of use of the stationery that differs depending on the combination of the category and the material property of the stationery.

In addition, in the first embodiment, the category includes a first category in which a frictional force against a predetermined object such as paper is relatively large and a second category in which the frictional force is relatively small. The output circuit 58 outputs the first artificial sound in a case where the category is the first category, and the output circuit 58 outputs the second artificial sound, which is emphasized as compared with the first artificial sound, in a case where the category is the second category. According to this configuration, different artificial sounds can be output to correspond to a change in actual writing feel, according to the category corresponding to the frictional force as one element affecting the writing feel. For example, in a case where a fountain pen in the second category is selected by the user, an artificial sound is output to correspond to an emphasized pen state in which the pen pressure or the like is increased, as an actual pen state. Hence, even when the electronic pen 2 is operated with a small pen pressure value (light force), for example, an artificial sound corresponding to a pen pressure value larger than the pen pressure value is output. The user can thus be appropriately given a smooth writing feel (small friction degree) as if the user were actually writing with a fountain pen.

In addition, in the first embodiment, the first category includes a ballpoint pen or a pencil, and the second category includes a fountain pen or a writing brush. According to this configuration, the above-described effects can suitably be produced, and such an artificial sound that can give the user a writing feel of the fountain pen or the writing brush, which is less likely to produce an actual writing sound than the ballpoint pen or the pencil, can appropriately be output.

In addition, the position detection system 1 according to the first embodiment further includes the detecting circuit 64 configured to detect a pen state representing a state of the electronic pen 2 with respect to the input surface 16 and an operation state representing a state of the operation of the electronic pen 2. When the operation state is a pen-down state, the output circuit 58 outputs the artificial sound on the basis of a pen pressure as the pen state, and when the operation state is a pen movement state, the output circuit 58 outputs the artificial sound on the basis of a posture or a movement as the pen state. According to this configuration, the artificial sound is output on the basis of the pen pressure that tends to change, when the operation state is a pen-down state. On the other hand, the artificial sound is output on the basis of the posture or the movement of the electronic pen 2 which is more likely to change than the pen pressure, when the operation state is a pen movement state. Thus, an artificial sound that gives the user the feel of use of the stationery that corresponds to the operation state can be output appropriately.

In addition, in the first embodiment, when the operation state is a pen movement state, the output circuit 58 outputs the artificial sound on the basis of acceleration. According to this configuration, the user can appropriately be given the feel of use of the stationery to which a force is applied by the acceleration in the pen movement state.

In addition, in the first embodiment, when the operation state is a pen-up state, the output circuit 58 changes an output duration from a time point of detection of the pen-up state to a time point of stopping of the output of the artificial sound, on the basis of the pen state. According to this configuration, after the timing when the electronic pen 2 moves away from the input surface 16 in the pen-up state, the output of the artificial sound is stopped immediately and sharply, so that the user can be given such a writing feel as to "stop a stroke" at a time of writing. Alternately, the output of the artificial sound is not stopped immediately after the timing described above but is kept a little longer and is then stopped, so that the user can be given such a writing feel as to "sweep a stroke" at a time of writing.

In addition, in the first embodiment, the stationery includes an erasing tool for erasing writing. In a case where the stationery is the erasing tool, the output circuit 58 outputs, as the artificial sound, an artificial erasing sound imitating an erasing sound occurring when the writing is erased by the erasing tool. According to this configuration, the artificial erasing sound can give the user an erasing feel that differs depending on the combination of the category and the material property of the erasing tool.

In addition, in the first embodiment, the receiving circuit 66 is included in the touch IC 20, and the output circuit 58 is included in the electronic pen 2. According to this configuration, the processing of the receiving circuit 66 can appropriately be performed in the touch IC 20, and the artificial sound is output from the electronic pen 2. This can make the user feel as if the artificial sound were made as a result of contact between the electronic pen 2 and the input surface 16.

Second Embodiment

A position detection system 1A according to a second embodiment of the present disclosure will next be described with reference to FIGS. 8 to 12. In the first embodiment, the example in which a sound ID is determined on the touch IC 20 side and an artificial sound corresponding to the sound ID is obtained on the electronic pen 2 side has been described. In contrast, the position detection system 1A according to the second embodiment is different from that of the first embodiment in that an artificial sound is generated on a touch IC 20A side and the generated artificial sound is transmitted from a touch IC 20A to an electronic pen 2A by wireless communication. In the following description, components or functions similar to those of the first embodiment are denoted by the same reference signs, and description thereof will be omitted as appropriate. Differences from the first embodiment will be described below.

Figure 8:
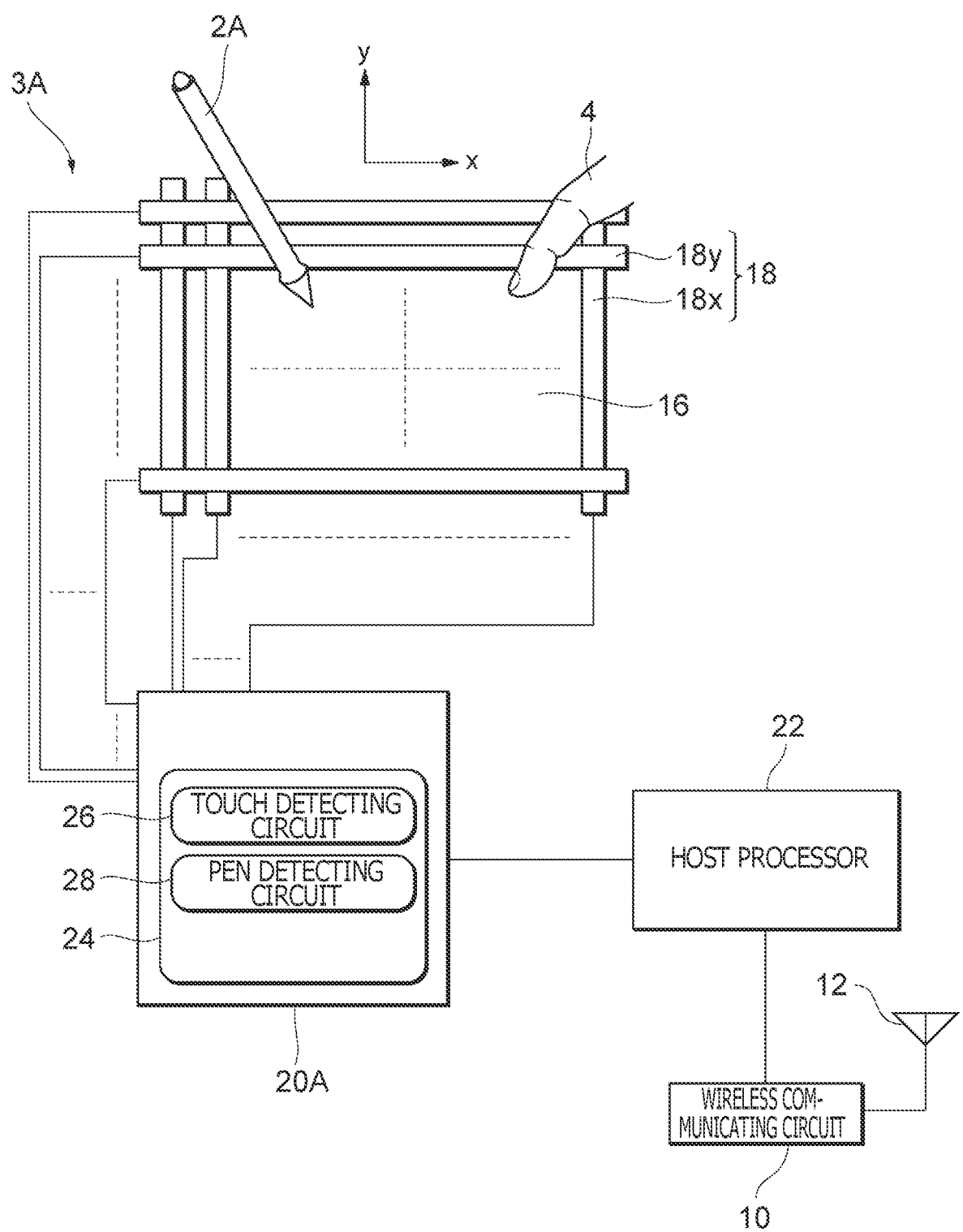
FIG. 8 is a diagram illustrating an example of a general configuration of a position detection system according to a second embodiment of the present disclosure.

FIG. 8 is a diagram illustrating an example of a general configuration of the position detection system 1A according to the second embodiment of the present disclosure. As illustrated in FIG. 8, the position detection system 1A according to the second embodiment includes the electronic pen 2A and an electronic apparatus 3A.

Figure 9:
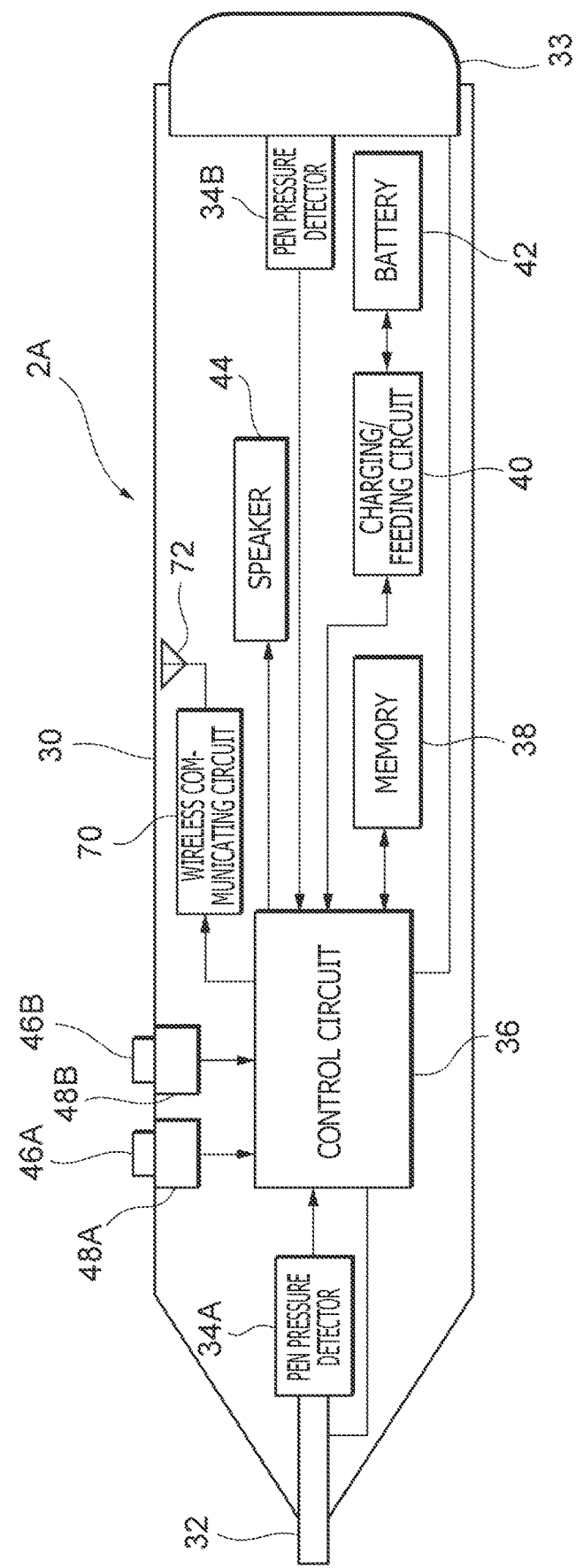
FIG. 9 is a diagram illustrating an example of a hardware configuration of an electronic pen in FIG. 8.

As with the electronic pen 2 according to the first embodiment, the electronic pen 2A is an electronic pen operated by the active capacitive system. FIG. 9 is a diagram illustrating an example of a hardware configuration of the electronic pen 2A in FIG. 8. As illustrated in FIG. 9, the electronic pen 2A is different from the electronic pen 2 according to the first embodiment in that the electronic pen 2A further includes a wireless communicating unit 70 and an antenna 72 in addition to a hardware configuration similar to that of the electronic pen 2. The wireless communicating unit 70 performs wireless communication with a wireless communicating unit 10 of the electronic apparatus 3A via the antenna 72 through a path different from those of the transmission of downlink signals through the tip electrode 32 and the tail electrode 33. The wireless communicating unit 70 performs, for example, a short-range wireless communication according to the Bluetooth (registered trademark) standard or the like.

Described with reference to FIG. 8 again, the electronic apparatus 3A includes the touch sensor 18, the touch IC 20A, the host processor 22, the wireless communicating unit 10, and an antenna 12. The touch IC 20A is an integrated circuit similar to the touch IC 20. The wireless communicating unit 10 performs wireless communication with the wireless communicating unit 70 of the electronic pen 2A via the antenna 12 through a path different from that of the transmission of uplink signals through the sensor electrodes 18x and 18y. The wireless communicating unit 10 performs, for example, short-range wireless communication according to the Bluetooth (registered trademark) standard or the like.

Figure 10:
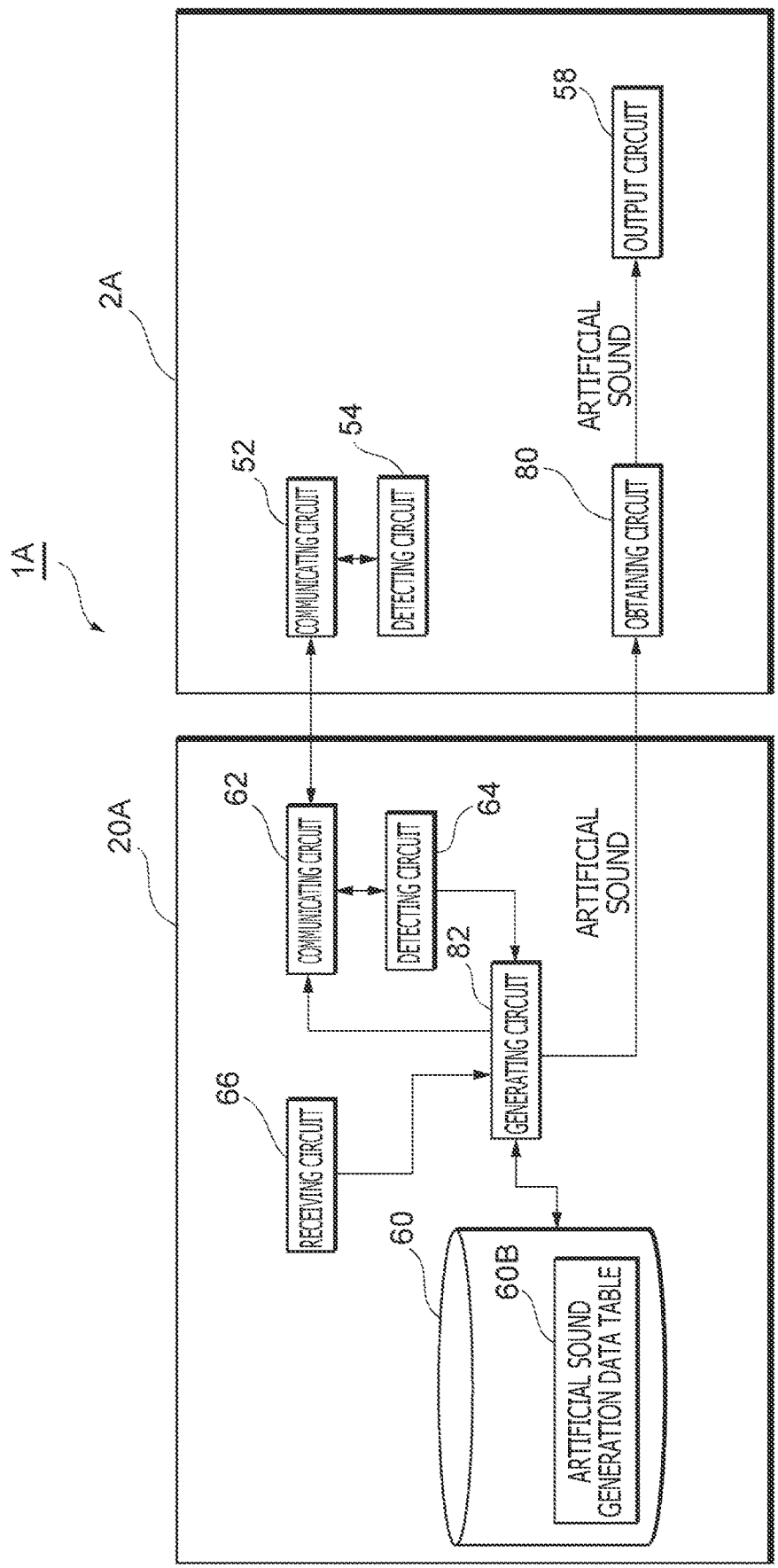
FIG. 10 is a functional block diagram illustrating an example of functional configurations of the electronic pen and a touch IC in FIG. 8.

FIG. 10 is a functional block diagram illustrating an example of functional configurations of the electronic pen 2A and the touch IC 20A in FIG. 8. As illustrated in FIG. 10, first, the electronic pen 2A includes, as the functional configuration thereof, the communicating circuit 52, the detecting circuit 54, the output circuit 58, and an obtaining circuit 80. Incidentally, part or the whole of the functional configuration included in the electronic pen 2A may be included in the touch IC 20A. The communicating circuit 52, the detecting circuit 54, and the output circuit 58 are similar to those of the first embodiment, and hence, description thereof will be omitted.

The obtaining circuit 80 obtains an artificial sound generated by a generating circuit 82 of the touch IC 20A, by wireless communication. The obtaining circuit 80 obtains artificial sound when the wireless communicating unit 70 of the electronic pen 2A receives the artificial sound generated by the generating circuit 82 and transmitted via the wireless communicating unit 10 of the electronic apparatus 3A. The obtaining circuit 80 outputs the obtained artificial sound to the output circuit 58.

Next, the touch IC 20A includes, as the functional configuration thereof, the storage device 60, the communicating circuit 62, the detecting circuit 64, the receiving circuit 66, and the generating circuit 82. Incidentally, part or the whole of the functional configuration included in the touch IC 20A may be included in the electronic pen 2A. The communicating circuit 62, the detecting circuit 64, and the receiving circuit 66 are similar to those of the first embodiment, and hence, description thereof will be omitted.

The storage device 60 according to the second embodiment stores an artificial sound generation data table 60B in addition to or in place of the sound ID data table 60A.

FIG. 11 is a diagram illustrating an example of the artificial sound generation data table 60B. As illustrated in FIG. 11, the artificial sound generation data table 60B stores recorded data and information indicating volumes and pitches (frequencies), in association with information indicating the categories of stationery, information indicating the material properties of the stationery, and information indicating the magnitude of pen detection values. The recorded data is data obtained by recording in advance, for each combination of a category and a material property of stationery, a sound occurring when the stationery is used in a predetermined usage state. The artificial sound generation data table 60B is, for example, set and stored in advance by a designer or the like. Incidentally, the artificial sound generation data table 60B may store information indicating tones in addition to or in place of the volumes and the pitches.

The generating circuit 82 generates an artificial sound on the basis of the selected combination which is received by the receiving circuit 66 and a pen state output from the detecting circuit 64. The generating circuit 82 refers to the artificial sound generation data table 60B and generates, as the artificial sound, data obtained by setting recorded data corresponding to the selected combination, which is received by the receiving circuit 66, to a volume or a pitch corresponding to the combination. In addition, the generating circuit 82 refers to the artificial sound generation data table 60B and generates, as the artificial sound, data obtained by setting recorded data corresponding to the magnitude of a pen detection value indicated by the pen state output from the detecting circuit 64, to a volume or a pitch corresponding to the pen detection value.

In addition, in a case where the selected stationery category which is received by the receiving circuit 66 is the first category, the generating circuit 82 generates, as the artificial sound, data obtained by setting recorded data corresponding to a pen detection value to a volume or a pitch corresponding to the pen detection value. In addition, in a case where the selected stationery category which is received by the receiving circuit 66 is the second category, the generating circuit 82 generates the second artificial sound that is emphasized as compared with the first artificial sound, which is the artificial sound generated in the case where the stationery category is the first category. For example, the generating circuit 82 generates, as the second artificial sound, data obtained by setting recorded data corresponding to the emphasized value, which is obtained by increasing the pen detection value indicated by the pen state by a predetermined value, to a volume or a pitch corresponding to the emphasized value.

In addition, the generating circuit 82 generates the artificial sound on the basis of the pen state that differs depending on the operation state of the electronic pen 2A. For example, when the operation state of the electronic pen 2A is a pen-down state, the generating circuit 82 generates the artificial sound on the basis of a pen pressure as the pen state. On the other hand, when the operation state of the electronic pen 2A is a pen movement state, the generating circuit 82 generates the artificial sound on the basis of the posture or the movement of the electronic pen 2A as the pen state.

In addition, when a pen-up state is detected by the detecting circuit 64, the generating circuit 82 calculates a reverberation time according to the pen-up timing. A specific method of calculation of the reverberation time is similar to the method of calculation of the reverberation time by the determining circuit 68 described in the first embodiment, and hence, description thereof will be omitted. The generating circuit 82 transmits the generated artificial sound and the calculated reverberation time to the wireless communicating unit 10 via the host processor 22. The artificial sound and the reverberation time transmitted to the wireless communicating unit 10 are transmitted from the wireless communicating unit 10 to the wireless communicating unit 70 of the electronic pen 2A.

<Operation of Position Detection System 1A>

Figure 12:
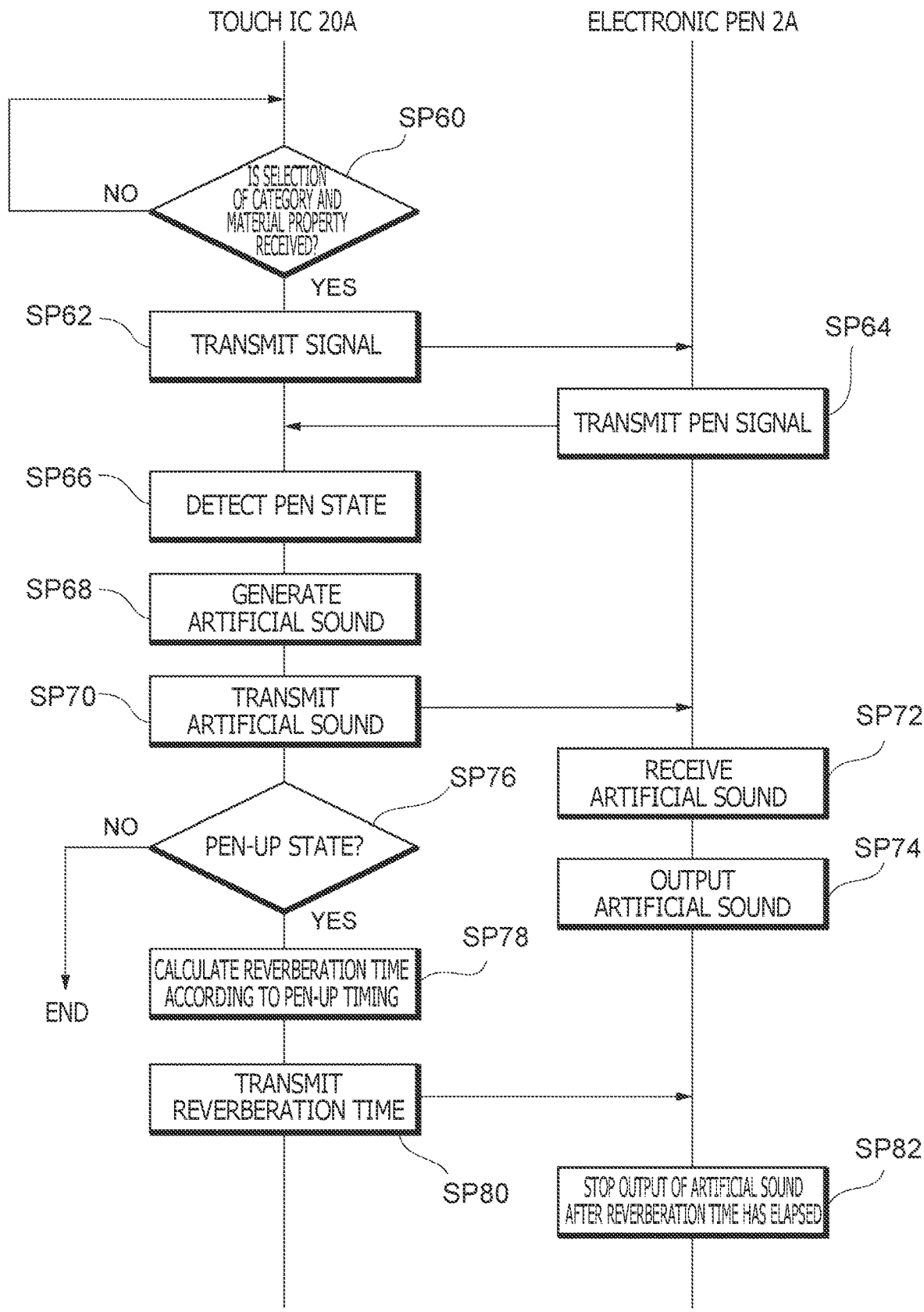
FIG. 12 is a flowchart illustrating an example of a flow of the operation of the position detection system according to the second embodiment of the present disclosure.

The operation of the position detection system 1A will next be described with reference to FIG. 12. FIG. 12 is a flowchart illustrating an example of a flow of the operation of the position detection system 1A. The flowchart illustrated in FIG. 12 corresponds to the flowchart illustrated in FIG. 5.

The processing of SP60 to SP66 is similar to the processing of SP10 to SP16 in FIG. 5, and hence, description thereof will be omitted. After SP66, the processing proceeds to SP68.

(SP68)

The generating circuit 82 of the touch IC 20A refers to the artificial sound generation data table 60B and generates an artificial sound corresponding to the selected combination which is received in the processing of SP60 and the pen state detected in the processing of SP66. At this time, the generating circuit 82 uses the pen pressure as the pen state when the operation state detected in the processing of SP66 is a pen-down state. On the other hand, the generating circuit 82 uses the pen inclination, the speed, or the acceleration as the pen state when the operation state is a pen movement state. In addition, the generating circuit 82 generates the first artificial sound corresponding to the pen state, when the stationery category included in the selected combination which is received in the processing of SP60 is the first category. On the other hand, the generating circuit 82 generates the second artificial sound corresponding to the emphasized pen state, when the stationery category included in the selected combination is the second category. Then, the processing proceeds to SP70.

(SP70)

The generating circuit 82 of the touch IC 20A transmits data regarding the artificial sound generated in the processing of SP68 to the wireless communicating unit 10 via the host processor 22. Then, the wireless communicating unit 10 transmits the data regarding the artificial sound generated in the processing of SP68 to the wireless communicating unit 70 of the electronic pen 2A. Then, the processing proceeds to SP72.

(SP72)

The wireless communicating unit 70 of the electronic pen 2A receives the artificial sound transmitted in the processing of SP70. Then, the processing proceeds to SP74.

The processing of the SP74 to SP82 is similar to the processing of SP26 to SP34 in FIG. 5, and hence, description thereof will be omitted. This ends the series of processing illustrated in FIG. 12.

<Actions and Effects>

As described above, as with the position detection system 1 according to the first embodiment, the position detection system 1A according to the second embodiment can also make, by the artificial sound, the user feel as if the user were actually using the stationery to be imitated. In addition, with the position detection system 1A according to the second embodiment, the artificial sound can be generated on the touch IC 20A side instead of being stored in advance. Thus, a more appropriate artificial sound can be generated and output on a real time basis according to the pen state or the like.

Third Embodiment

A position detection system 1B according to a third embodiment of the present disclosure will next be described with reference to FIGS. 13 to 15. In the first embodiment, the example in which the pen state is detected and the sound ID is determined on the touch IC 20 side and the artificial sound corresponding to the sound ID is obtained on the electronic pen 2 side has been described. In contrast, the position detection system 1B according to the third embodiment is different from that of the first embodiment in that the pen state is detected and the artificial sound is generated on an electronic pen 2B side. In the following description, components or functions similar to those of the first embodiment are denoted by the same reference signs, and description thereof will be omitted as appropriate. Differences from the first embodiment will be described below.

Figure 13:
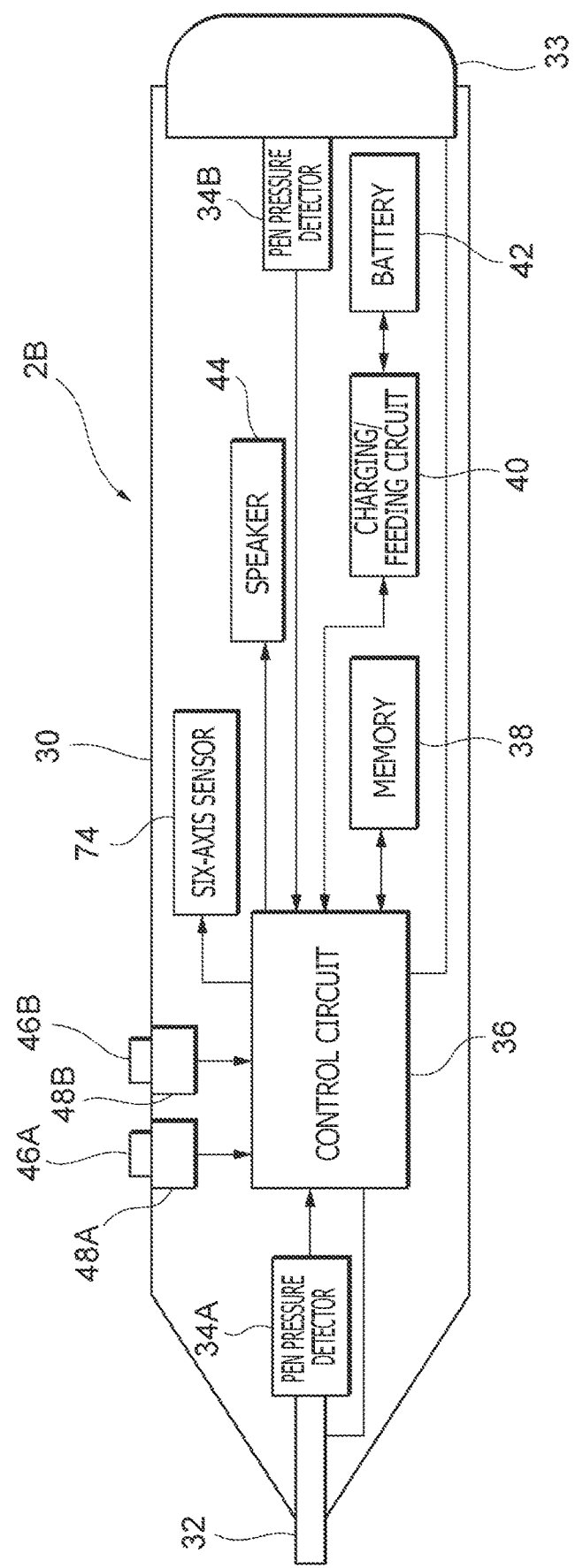
FIG. 13 is a diagram illustrating an example of a hardware configuration of an electronic pen according to a third embodiment of the present disclosure.

FIG. 13 is a diagram illustrating an example of a hardware configuration of the electronic pen 2B according to the third embodiment of the present disclosure. As illustrated in FIG. 13, the electronic pen 2B is different from the electronic pen 2 according to the first embodiment in that the electronic pen 2B further includes a six-axis sensor 74 in addition to a hardware configuration similar to that of the electronic pen 2. The six-axis sensor 74 detects the pen inclination, speed, acceleration, or the like of the electronic pen 2B.

Figure 14:
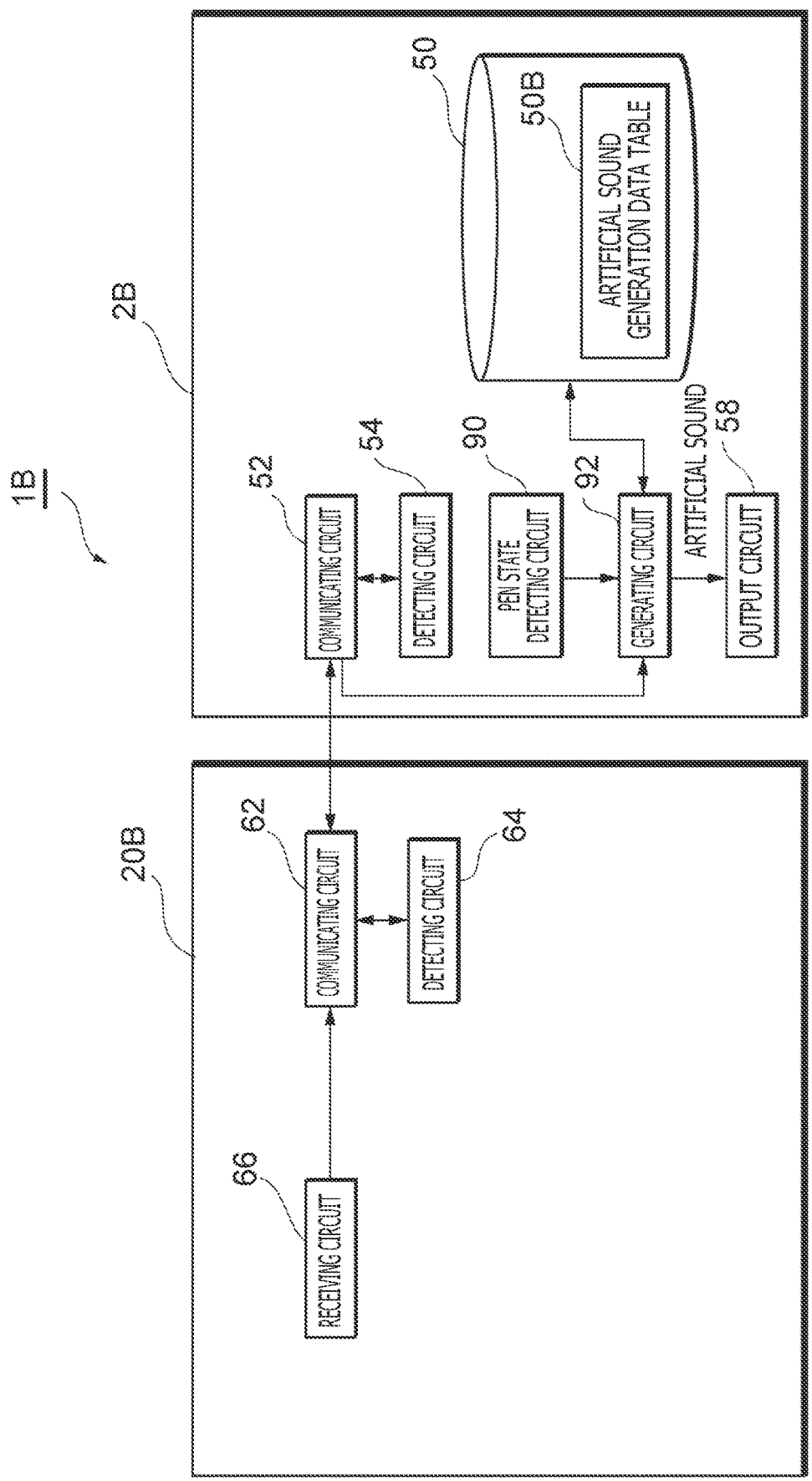
FIG. 14 is a functional block diagram illustrating an example of functional configurations of the electronic pen and a touch IC according to the third embodiment of the present disclosure.

FIG. 14 is a functional block diagram illustrating an example of functional configurations of the electronic pen 2B and a touch IC 20B according to the third embodiment. As illustrated in FIG. 14, the position detection system 1B according to the third embodiment includes the electronic pen 2B in place of the electronic pen 2 and includes the touch IC 20B in place of the touch IC 20.

First, the electronic pen 2B includes, as the functional configuration thereof, the storage device 50, the communicating circuit 52, the detecting circuit 54, the output circuit 58, a pen state detecting circuit 90, and a generating circuit 92. Incidentally, part or the whole of the functional configuration included in the electronic pen 2B may be included in the touch IC 20B.

The storage device 50 of the electronic pen 2B stores an artificial sound generation data table 50B in addition to or in place of the artificial sound data 50A according to the first embodiment. The artificial sound generation data table 50B is similar to the artificial sound generation data table 60B in the second embodiment, and hence, description thereof will be omitted.

In addition, the communicating circuit 52 of the electronic pen 2B receives, from the communicating circuit 62 of the touch IC 20B, information indicating the selected combination of the category and the material property of the stationery, which is received by the receiving circuit 66. The communicating circuit 52 outputs the information to the generating circuit 92.

The pen state detecting circuit 90 detects the pen state and the operation state. The pen state detecting circuit 90 detects the pen pressure value applied to the pen tip of the electronic pen 2B, by the pen pressure detectors 34A and 34B. In addition, the pen state detecting circuit 90 detects the pen inclination, speed, or acceleration of the electronic pen 2B by the six-axis sensor 74. In addition, the pen state detecting circuit 90 detects the operation state on the basis of the detected pen pressure value. The pen state detecting circuit 90 outputs each piece of detected information to the generating circuit 92.

The generating circuit 92 obtains the information indicating the selected combination of the category and the material property of the stationery, which is received by the receiving circuit 66, on the basis of the output from the communicating circuit 52. The generating circuit 92 refers to the artificial sound generation data table 50B and generates an artificial sound corresponding to the combination. In addition, the generating circuit 92 refers to the artificial sound generation data table 50B and generates an artificial sound corresponding to the pen state output from the pen state detecting circuit 90. The generation of the artificial sounds by the generating circuit 92 is performed similarly to that by the generating circuit 82 according to the second embodiment, and hence, description thereof will be omitted. In addition, when a pen-up state is detected by the pen state detecting circuit 90, the generating circuit 92 calculates a reverberation time according to a pen-up timing. The generating circuit 92 outputs the generated artificial sound and the calculated reverberation time to the output circuit 58. The generation of the artificial sounds by the generating circuit 92 and the calculation of the reverberation time by the generating circuit 92 are performed similarly to those by the generating circuit 82 according to the second embodiment, and hence, description thereof will be omitted. In addition, the other functional configuration of the electronic pen 2B is similar to that of the first embodiment, and hence, description thereof will be omitted.

Next, the touch IC 20B includes, as the functional configuration thereof, the communicating circuit 62, the detecting circuit 64, and the receiving circuit 66. Incidentally, part or the whole of the functional configuration included in the touch IC 20B may be included in the electronic pen 2B.

In the touch IC 20B, the receiving circuit 66 outputs, to the communicating circuit 62, the information indicating the selected combination of the category and the material property of the stationery, which is received by the receiving circuit 66. In addition, the communicating circuit 62 transmits the information indicating the combination, which is output from the receiving circuit 66, to the communicating circuit 52 of the electronic pen 2B. The other functional configuration of the touch IC 20B is similar to that of the first embodiment, and hence, description thereof will be omitted.

<Operation of Position Detection System 1B>

The operation of the position detection system 1B will next be described with reference to FIG. 15. FIG. 15 is a flowchart illustrating an example of a flow of the operation of the position detection system 1B. The flowchart illustrated in FIG. 15 corresponds to the flowchart illustrated in FIG. 5.

The processing of SP90 to SP94 is similar to the processing of SP10 to SP14 in FIG. 5, and hence, description thereof will be omitted. After SP94, the processing proceeds to SP96.

(SP96)

The pen state detecting circuit 90 of the electronic pen 2B detects the value of a pen pressure applied to the pen tip of the electronic pen 2B, by the pen pressure detectors 34A and 34B. In addition, the pen state detecting circuit 90 detects the operation state of the electronic pen 2B on the basis of the detected pen pressure value. In addition, the pen state detecting circuit 90 detects the pen inclination, speed, or acceleration of the electronic pen 2B by the six-axis sensor 74.

(SP98)

The generating circuit 92 of the electronic pen 2B refers to the artificial sound generation data table 50B and generates an artificial sound corresponding to the selected combination which is received in the processing of SP90 and the pen state detected in the processing of SP96. At this time, the generating circuit 92 uses the pen pressure as the pen state when the operation state detected in the processing of SP96 is a pen-down state. On the other hand, the generating circuit 92 uses the pen inclination, the speed, or the acceleration as the pen state when the operation state is a pen movement state. In addition, the generating circuit 92 generates an artificial sound corresponding to the pen state, when the stationery category included in the selected combination which is received in the processing of SP90 is the first category. On the other hand, the generating circuit 92 generates an artificial sound corresponding to the emphasized pen state, when the stationery category included in the selected combination is the second category. Then, the processing proceeds to SP100.

The processing of SP100 is similar to the processing of SP26 in FIG. 5, and hence, description thereof will be omitted. Then, the processing proceeds to SP102.

(SP102)

The pen state detecting circuit 90 of the electronic pen 2B determines whether or not a pen-up state is detected in the processing of SP96. When a pen-up state is determined to have been detected, that is, the result of the determination is affirmative, the processing proceeds to SP104. When no pen-up state is determined to have been detected, that is, the result of the determination is negative, the series of processing illustrated in FIG. 15 is ended.

(SP104)

The generating circuit 92 calculates a pen-up timing on the basis of the acceleration of the electronic pen 2B that is about to move away from the input surface 16, and calculates a reverberation time according to the pen-up timing. Then, the processing proceeds to SP106.

(SP106)

The output circuit 58 of the electronic pen 2B stops the output of the artificial sound being output in the processing of SP100, after the received reverberation time has elapsed.

Figure 15:
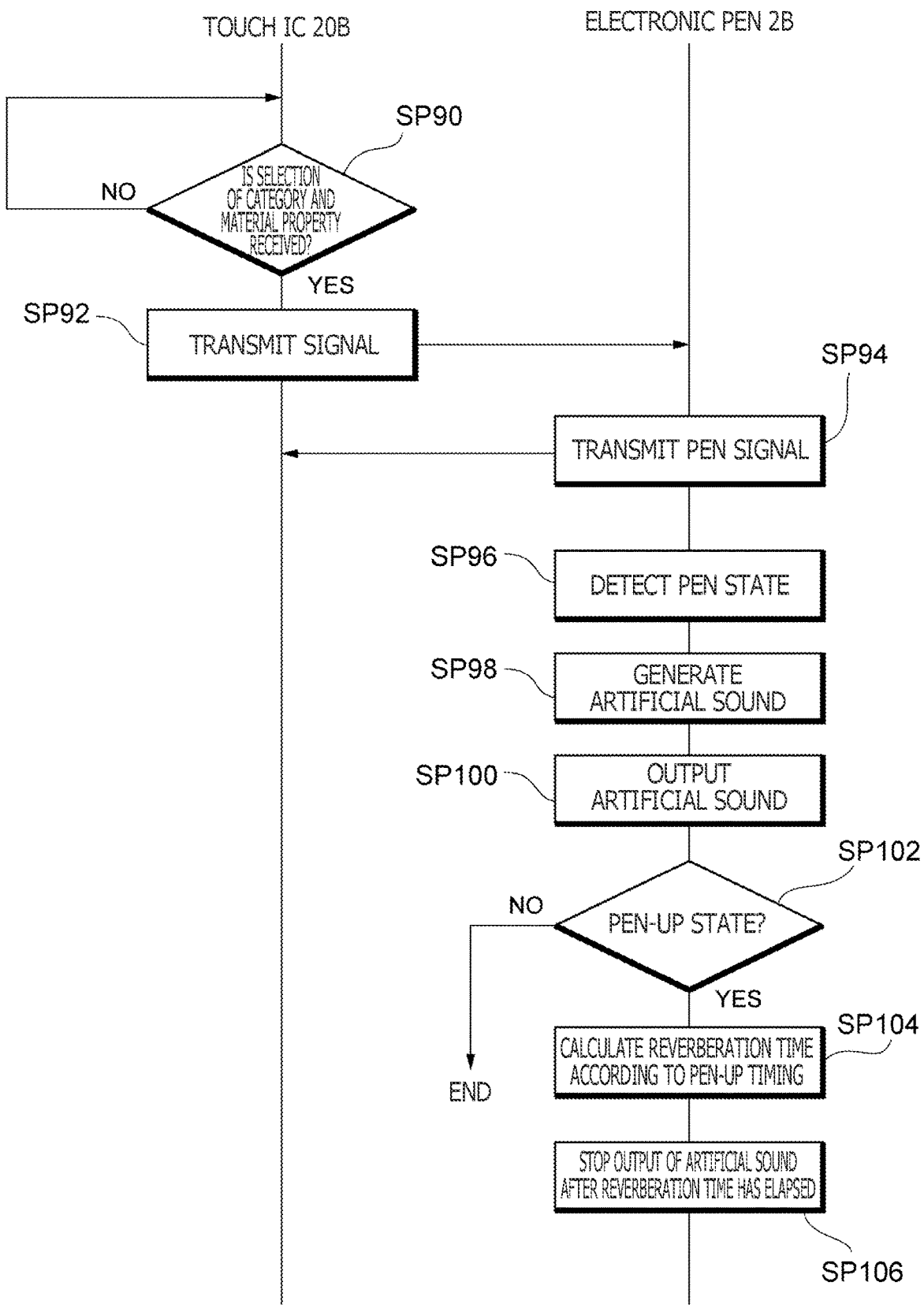
FIG. 15 is a flowchart illustrating an example of a flow of the operation of a position detection system according to the third embodiment of the present disclosure.

This ends the series of processing illustrated in FIG. 15.

<Actions and Effects>

As described above, as with the position detection system 1 according to the first embodiment, the position detection system 1B according to the third embodiment can also make, by the artificial sound, the user feel as if the user were actually using the stationery to be imitated. In addition, with the position detection system 1B according to the third embodiment, the artificial sound can be generated on the electronic pen 2B side instead of being stored in advance. Thus, a more appropriate artificial sound can be generated and output on a real time basis according to the pen state or the like.

Fourth Embodiment

A position detection system 1C according to a fourth embodiment of the present disclosure will next be described with reference to FIG. 16 and FIG. 17. In the first embodiment, the example in which the electronic pen 2 outputs an artificial sound corresponding to a sound ID in response to the operation of the electronic pen 2 has been described. In contrast, the position detection system 1C according to the fourth embodiment is different from that of the first embodiment in that an electronic pen 2C outputs a sound different from the artificial sound. In the following description, components or functions similar to those of the first embodiment are denoted by the same reference signs, and description thereof will be omitted as appropriate. Differences from the first embodiment will be described below.

Figure 16:
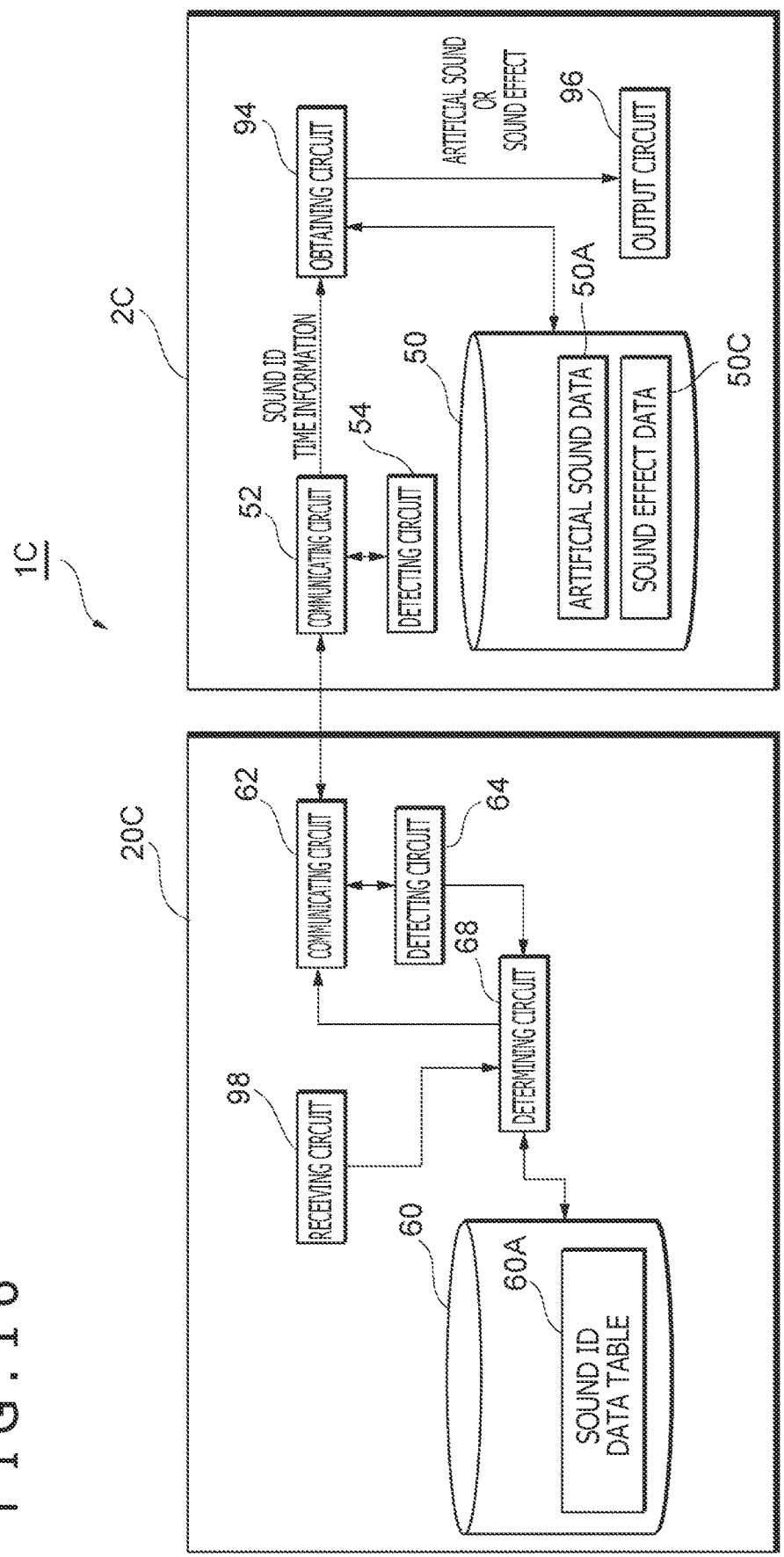
FIG. 16 is a functional block diagram illustrating an example of functional configurations of an electronic pen and a touch IC according to a fourth embodiment of the present disclosure.

FIG. 16 is a functional block diagram illustrating an example of functional configurations of the electronic pen 2C and a touch IC 20C according to the fourth embodiment of the present disclosure. As illustrated in FIG. 16, the position detection system 1C according to the fourth embodiment includes the electronic pen 2C and the touch IC 20C incorporated in an electronic apparatus. As with the electronic pen 2 according to the first embodiment, the electronic pen 2C is an electronic pen operated by the active capacitive system.

As illustrated in FIG. 16, first, the electronic pen 2C includes, as the functional configuration thereof, the storage device 50, the communicating circuit 52, the detecting circuit 54, an obtaining circuit 94, and an output circuit 96. Incidentally, part or the whole of the functional configuration included in the electronic pen 2C may be included in the touch IC 20C. The communicating circuit 52 and the detecting circuit 54 are similar to those of the first embodiment, and hence, description thereof will be omitted.

The storage device 50 further stores sound effect data 50C in addition to the artificial sound data 50A. The sound effect data 50C is data representing sound effects for providing representation effects or operation effects. The sound effect data 50C is, for example, set and stored in advance by a designer or the like. The sound effects may be relatively short sound sources such as jingles, or may be relatively long sound sources such as music.

Examples of the sound effects for providing the representation effects include [1] sounds occurring in a real world, [2] sounds describing conditions and states, and [3] sounds representing emotions. Examples of the sound effects for providing the operation effects include [1] sounds giving notice that the operation of the electronic pen 2C is received and [2] sounds giving notice that a display mode is changed according to the operation of the electronic pen 2C.

The obtaining circuit 94 obtains the artificial sound data 50A or the sound effect data 50C on the basis of a sound ID and time information output from the communicating circuit 52. The obtaining circuit 94 outputs the obtained artificial sound data 50A or the obtained sound effect data 50C to the output circuit 96. The time information includes a time point related to the execution of a writing application for performing writing with the use of the electronic pen 2C (the time point will hereinafter be referred to as an execution reference time point) or an elapsed time from the execution reference time point. The execution reference time point is, for example, [1] a time point of the start of the writing application, [2] a time point when the writing application returns to a normal mode from a sleep mode during the execution, or [3] a time point when writing of contents is started during the execution of the writing application. The elapsed time may be reset each time the execution reference time point is set. Alternatively, once the execution reference time point is set, the elapsed time may be accumulated until time measurement is ended.

The obtaining circuit 94 determines whether or not to output an artificial sound, on the basis of the elapsed time from the execution reference time point of the writing application. When the artificial sound is to be output, the obtaining circuit 94 obtains the artificial sound data 50A corresponding to the sound ID. When the artificial sound is not to be output, the obtaining circuit 94 determines whether or not to output a sound effect, on the basis of the elapsed time from the execution reference time point of the writing application. When the sound effect is to be output, the obtaining circuit 94 obtains the corresponding sound effect data 50C.

The output circuit 96 outputs the artificial sound or the sound effect to the outside from the speaker 44 on the basis of the artificial sound data 50A or the sound effect data 50C supplied from the obtaining circuit 94. In this case, in response to the operation of the electronic pen 2C for inputting a pen position, the output circuit 96 switches whether or not to output the artificial sound or changes an output mode of the artificial sound according to the elapsed time from the execution reference time point of the writing application. While the artificial sound is not output, the output circuit 96 may not output a sound, or may output the sound effect in place of the artificial sound. The changing of the output mode includes, for example, changing of a volume, a pitch, or a tone.

For example, the output circuit 96 outputs the artificial sound when the elapsed time exceeds a first threshold value, but does not output the artificial sound when the elapsed time does not exceed the first threshold value. Alternatively, the output circuit 96 outputs the artificial sound when the elapsed time is less than a second threshold value, but does not output the artificial sound when the elapsed time is not less than the second threshold value. The second threshold value may be the same value as the first threshold value, or may be a value different from the first threshold value.

Next, the touch IC 20C includes, as the functional configuration thereof, the storage device 60, the communicating circuit 62, the detecting circuit 64, the determining circuit 68, and a receiving circuit 98. Incidentally, part or the whole of the functional configuration included in the touch IC 20C may be included in the electronic pen 2C. The storage device 60, the communicating circuit 62, the detecting circuit 54, and the determining circuit 68 are similar to those of the first embodiment, and hence, description thereof will be omitted.

The receiving circuit 98 receives not only a selection of a combination of a category and a material property of stationery but also time information related to the writing application for performing writing with the use of the electronic pen 2C. The time information includes the execution reference time point related to the execution of the writing application or the elapsed time from the execution reference time point. The time information is supplied from the host processor 22 configured to be capable of executing the writing application. The receiving circuit 98 outputs combination selection information to the determining circuit 68 and also outputs the time information to the communicating circuit 62.

<Operation of Position Detection System 1C>

The operation of the position detection system 1C will next be described. The position detection system 1C basically operates in a similar manner to that of the first embodiment. The operation of the position detection system 1C is different from the operation of the position detection system 1 in that [1] the touch IC 20C supplies a sound ID and time information to the electronic pen 2C and that [2] the output circuit 96 selectively outputs an artificial sound and a sound effect. The operation at SP24 and SP26 as main differences from the first embodiment will be described below.

At SP24 in FIG. 5, the obtaining circuit 94 of the electronic pen 2C selectively obtains the artificial sound data 50A or the sound effect data 50C on the basis of the sound ID and the time information output from the communicating circuit 52 of the touch IC 20C.

Figure 17:
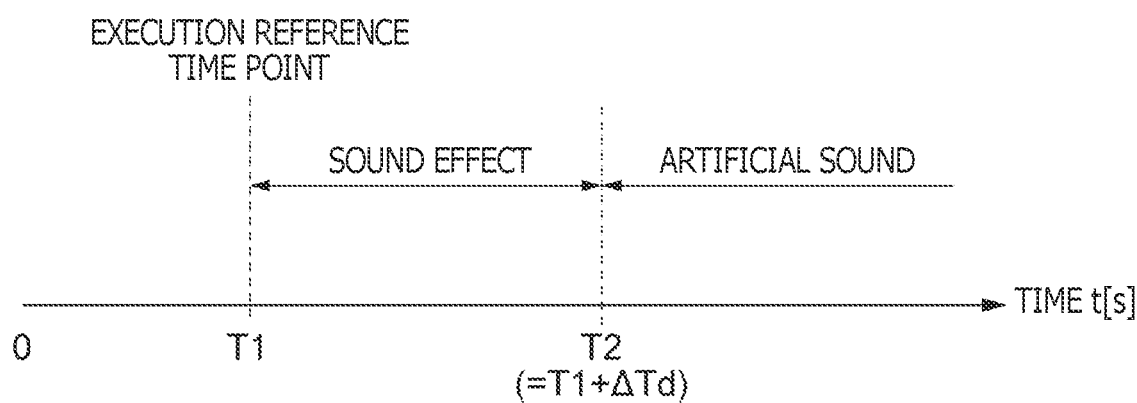
FIG. 17 is a conceptual diagram of assistance in explaining sounds that are output according to an elapsed time from an execution reference time point of a writing application.

FIG. 17 is a conceptual diagram of assistance in explaining sounds that are output according to the elapsed time from the execution reference time point of the writing application. A horizontal axis in the graph indicates time t (unit: s). In a case where t=T1 is the execution reference time, the kind of sound is determined according to whether or not the elapsed time exceeds a time threshold value ($\Delta Td$). In the example of FIG. 17, a sound effect is selected when a relation $T1 \leq t < T2$ is satisfied, whereas an artificial sound is selected when a relation $t \geq T2$ is satisfied. Incidentally, $T2=T1+\Delta Td$.

At SP26 in FIG. 5, the output circuit 96 of the electronic pen 2C outputs the sound effect or the artificial sound selectively obtained by the obtaining circuit 94 to the outside. This ends the series of processing illustrated in FIG. 5.

Incidentally, an artificial sound including many pink noises may give a comfortable feeling to a user who is accustomed to the sound, and motivate the user, in some cases. This could be explained by a high correlation between being accustomed to the sound and a proficiency level of learning or the like. That is, the output of the artificial sound is suitable for such a task that, as a person experiences the task over a longer period of time, his or her proficiency level is increased (for example, a study, education, a hobby, or the like).

On the other hand, sound effects different from the artificial sound correspond to what is called gamification, and may have, for example, an effect of developing an ability of a person at once or giving an opportunity for a change of pace. That is, the output of the sound effects is suitable for such a task that a person has not experienced in the past (for example, a study, education, a hobby, or the like).

<Actions and Effects>

As described above, as with the position detection system 1 according to the first embodiment, the position detection system 1C according to the fourth embodiment can also make, by the artificial sound, the user feel as if the user were actually using the stationery to be imitated.

In addition, in the fourth embodiment, the receiving circuit 98 further receives the execution reference time point, which is a time point related to the execution of the writing application for performing writing with the use of the electronic pen 2C, or the elapsed time from the execution reference time point, and the output circuit 96 switches whether or not to output the artificial sound or changes an output mode of the artificial sound according to the elapsed time from the execution reference time point. According to this configuration, the user can be given an opportunity for changing the mood of the user, by temporally changing the output of the artificial sound.

In addition, in the fourth embodiment, the output circuit 96 outputs the artificial sound when the elapsed time exceeds a threshold value, but does not output the artificial sound when the elapsed time does not exceed the threshold value. According to this configuration, for example, the output of the artificial sound is continued until the user concentrates on a task involving the writing operation after a sufficient period of time has elapsed from the execution reference time point, so that the user may be immersed in a writing operation more easily.

In addition, in the fourth embodiment, the output circuit 96 outputs the artificial sound when the elapsed time is less than a threshold value, but does not output the artificial sound when the elapsed time is not less than the threshold value. According to this configuration, for example, the output of the artificial sound is stopped when the user concentrates on a task involving the writing operation after a sufficient period of time has elapsed from the execution reference time point, so that the user may be immersed in a writing operation more easily.

In addition, in the fourth embodiment, while not outputting the artificial sound, the output circuit 96 outputs a sound effect for providing a representation effect or an operation effect. For example, in a state in which a sufficient period of time has not elapsed since the execution reference time point and the user is not yet able to concentrate on a task involving a writing operation, the output of the sound effect may give the user an opportunity for a change of pace and provide an effect of enhancing the motivation of the user.

In addition, in the fourth embodiment, the execution reference time point is a time point of the start of the writing application, a time point when the writing application returns to a normal mode from a sleep mode during the execution, or a time point when writing of contents is started during the execution of the writing application. Thus, the elapsed time can be measured with a timing when the user starts or resumes a task, as a reference.

[Modifications]

The present disclosure is not limited to the foregoing embodiments. That is, modifications can be made on the design of the foregoing embodiments as appropriate by those skilled in the art, and such modifications are intended to be within the scope of the present disclosure as long as they have features of the present disclosure. In addition, elements included in the foregoing embodiments and modifications to be described later can be combined with one another where technically possible. Combinations of these elements are also included in the scope of the present disclosure as long as they include features of the present disclosure.

For example, in the foregoing embodiments, the example in which each of the touch ICs 20, 20A, 20B, and 20C includes the receiving circuit 66. However, each of the electronic pens 2, 2A, 2B, and 2C may include a receiving circuit that receives a selection of a combination of a category and a material property of stationery to be imitated. In this case, for example, an operation of the side switch 48A or 48B may be received, and a selection of a category or a material property of stationery may accordingly be changed, thereby receiving the selection of the combination of the category and the material property.

In addition, the position detection system according to the present disclosure may output an artificial sound imitating a sound occurring when stationery indicated by a predetermined category and a predetermined material property is used, without receiving a selection of a combination of a category and a material property of stationery. For example, the position detection systems 1, 1A, 1B, and 1C according to the foregoing embodiments may not include the receiving circuit 66. In this case, as in the foregoing embodiments, in response to the operation of the electronic pen 2, 2A, 2B, and 2C for inputting a pen position, the output circuit 58 outputs the artificial sound imitating the sound occurring when the stationery to be imitated is used, on the basis of the pen state that differs depending on the operation state. In such a manner, even in a case where a selection of a combination of a category and a material property of stationery is not received, the artificial sound that gives the user the feel of use of the stationery that corresponds to the pen state can be output appropriately. That is, the artificial sound can make the user feel as if the user were actually using the stationery to be imitated.

In addition, the touch sensor 18 is not limited to the capacitive system, and may be, for example, a touch sensor of an electromagnetic induction system (electro-magnetic resonance (EMR)), and the touch sensor 18 may detect a pen position by exchanging signals with the electronic pen 2 by the electromagnetic induction system. In addition, the electronic apparatuses 3 and 3A may include the output circuit 58 and output the artificial sound in place of the electronic pens 2, 2A, 2B, and 2C.

What is claimed is:

1. A position detection system that includes an electronic pen and a detecting circuit configured to detect a position indicated by the electronic pen on an input surface of a touch sensor in which a plurality of sensor electrodes are arranged in a planar shape, the position detection system comprising:
    at least one processor; and
    at least one memory storing instructions that, when executed by the at least one processor, cause the position detection system to:
        receive a selection of a category of a stationery to be imitated;
        detect a pen state representing a state of the electronic pen with respect to the input surface and an operation state representing a state of an operation of the electronic pen;
        output, in response to an input operation performed by the electronic pen to indicate the position, an artificial sound imitating a sound occurring when the stationery is used, according to the selection of the category of the stationery to be imitated that is received;
        receive a selection of a combination of the category and a material property of the stationery; and
        output the artificial sound according to the selection of the combination of the category and the material property of the stationery that is received.

2. The position detection system according to claim 1, wherein the instructions, when executed by the at least one processor, cause the position detection system to:
    when the operation state is a pen-up state indicating that the electronic pen moves away from the input surface, change an output duration from a time point of detection of the pen-up state to a time point of stopping of the output of the artificial sound, based on the pen state.

3. The position detection system according to claim 2, wherein the instructions, when executed by the at least one processor, cause the position detection system to:
when the operation state is a pen-down state indicating that the electronic pen comes into contact with the input surface, output the artificial sound based on a pen pressure of the electronic pen as the pen state, and
when the operation state is a pen movement state indicating that the electronic pen moves on the input surface, output the artificial sound based on a posture or a movement of the electronic pen as the pen state.

4. The position detection system according to claim 2, wherein the instructions, when executed by the at least one processor, cause the position detection system to:
when the operation state is a pen movement state indicating that the electronic pen moves on the input surface, output the artificial sound based on acceleration of the electronic pen as the pen state.

5. The position detection system according to claim 1, wherein the instructions, when executed by the at least one processor, cause the position detection system to:
receive an execution reference time point related to execution of a writing application for performing writing with use of the electronic pen or an elapsed time from the execution reference time point, and
switch whether or not to output the artificial sound or change an output mode of the artificial sound according to the elapsed time.

6. The position detection system according to claim 5, wherein the instructions, when executed by the at least one processor, cause the position detection system to:
while not outputting the artificial sound, output a sound effect that provides a representation effect or an operation effect.

7. The position detection system according to claim 5, wherein
the execution reference time point is a time point of a start of the writing application, a time point when the writing application returns to a normal mode from a sleep mode during the execution of the writing application, or a time point when writing of contents is started during the execution of the writing application.

8. The position detection system according to claim 1, wherein
the material property includes hardness of a tip end portion of the stationery or viscosity of an adhering medium from the tip end portion.

9. The position detection system according to claim 1, wherein the instructions, when executed by the at least one processor, cause the position detection system to:
output the artificial sound with a volume, a pitch, or a tone corresponding to the combination.

10. The position detection system according to claim 1, wherein
the category includes a first category in which a frictional force against a predetermined target object is relatively large and a second category in which the frictional force is relatively small, and
the instructions, when executed by the at least one processor, cause the position detection system to output a first artificial sound when the category is the first category, and output a second artificial sound that is emphasized as compared with the first artificial sound, when the category is the second category.

11. The position detection system according to claim 10, wherein
the first category includes a ballpoint pen or a pencil, and
the second category includes a fountain pen or a writing brush.

12. The position detection system according to claim 1, wherein
the stationery includes an erasing tool which, in operation, erases writing, and
the instructions, when executed by the at least one processor, cause the position detection system to output, as the artificial sound, an artificial erasing sound imitating an erasing sound occurring when the writing is erased by the erasing tool.

13. The position detection system according to claim 1, wherein the instructions, when executed by the at least one processor, cause the position detection system to:
generate the artificial sound imitating the sound occurring when the stationery is used, according to the selection of the combination that is received, and
output, in response to the input operation performed by the electronic pen to indicate the position, the artificial sound.

14. The position detection system according to claim 1, wherein
the at least one processor includes a first processor and a second processor,
the first processor is disposed in the detecting circuit,
the first processor, in operation, receives the selection of the category of the stationery to be imitated,
the second processor is disposed in the electronic pen, and
the second processor, in operation, outputs the artificial sound imitating the sound occurring when the stationery is used, according to the selection of the category that is received.

15. A position detection system that includes an electronic pen and a detecting circuit configured to detect a position indicated by the electronic pen on an input surface of a touch sensor in which a plurality of sensor electrodes are arranged in a planar shape, the position detection system comprising:
at least one processor; and
at least one memory storing instructions that, when executed by the at least one processor, cause the position detection system to:
receive a selection of a category of a stationery to be imitated;
detect a pen state representing a state of the electronic pen with respect to the input surface and an operation state representing a state of an operation of the electronic pen;
output, in response to an input operation performed by the electronic pen to indicate the position, an artificial sound imitating a sound occurring when the stationery is used, according to the selection of the category of the stationery to be imitated that is received;
receive an execution reference time point related to execution of a writing application for performing writing with use of the electronic pen or an elapsed time from the execution reference time point;
switch whether or not to output the artificial sound or change an output mode of the artificial sound according to the elapsed time; and
output the artificial sound when the elapsed time exceeds a threshold value, and not output the artificial sound when the elapsed time does not exceed the threshold value.

16. A position detection system that includes an electronic pen and a detecting circuit configured to detect a position indicated by the electronic pen on an input surface of a touch sensor in which a plurality of sensor electrodes are arranged in a planar shape, the position detection system comprising:
- at least one processor; and
- at least one memory storing instructions that, when executed by the at least one processor, cause the position detection system to:
  - receive a selection of a category of a stationery to be imitated;
  - detect a pen state representing a state of the electronic pen with respect to the input surface and an operation state representing a state of an operation of the electronic pen;
  - output, in response to an input operation performed by the electronic pen to indicate the position, an artificial sound imitating a sound occurring when the stationery is used, according to the selection of the category of the stationery to be imitated that is received;
  - receive an execution reference time point related to execution of a writing application for performing writing with use of the electronic pen or an elapsed time from the execution reference time point;
  - switch whether or not to output the artificial sound or change an output mode of the artificial sound according to the elapsed time; and
  - output the artificial sound when the elapsed time is less than a threshold value, and not output the artificial sound when the elapsed time is not less than the threshold value.

* * * * *